US005903401A

United States Patent [19]

Tanaka et al.

[11] Patent Number: 5,903,401

[45] Date of Patent: May 11, 1999

[54] READING UNIT AND RECORDING APPARATUS CAPABLE OF MOUNTING SUCH READING UNIT THEREON

[75] Inventors: Hiroyuki Tanaka, Kawasaki; Tsutomu Kawai, Yokohama; Shinya Asano, Tokyo; Kenji Kawazoe, Yokohama; Hideo Fukazawa, Chigasaki, all of Japan

[73] Assignee: Canon Kabushiki Kaisha, Tokyo, Japan

[21] Appl. No.: 08/652,966

[22] Filed: May 24, 1996

[30] Foreign Application Priority Data

| | | | |
|---|---|---|---|
| May 26, 1995 | [JP] | Japan | 7-128608 |
| May 26, 1995 | [JP] | Japan | 7-128611 |
| Oct. 18, 1995 | [JP] | Japan | 7-269809 |
| Oct. 18, 1995 | [JP] | Japan | 7-269810 |
| Nov. 7, 1995 | [JP] | Japan | 7-288503 |

[51] Int. Cl.[6] .................... G02B 27/02

[52] U.S. Cl. .................... 359/806; 358/471; 358/474; 358/482; 358/298; 347/19

[58] Field of Search .................... 359/806; 358/474, 358/475, 496, 471, 482, 298; 250/231.11, 208.1, 231.19, 237 G; 347/19

[56] References Cited

U.S. PATENT DOCUMENTS

| | | | |
|---|---|---|---|
| 4,168,888 | 9/1979 | Kiehl et al. | 359/806 |
| 4,234,244 | 11/1980 | Klein | 359/806 |
| 4,491,434 | 1/1985 | Barr et al. | 359/806 |
| 4,589,143 | 5/1986 | Baur et al. | 382/61 |
| 4,594,788 | 6/1986 | Abergel | 359/806 |
| 4,680,644 | 7/1987 | Shirato et al. | 358/474 |
| 4,687,352 | 8/1987 | Igi et al. | 400/73 |
| 4,791,493 | 12/1988 | Ogura et al. | 358/475 |
| 4,920,431 | 4/1990 | Ogura et al. | 358/496 |
| 4,926,058 | 5/1990 | Iwamoto et al. | 250/578.1 |
| 4,996,606 | 2/1991 | Kawai et al. | 358/475 |
| 5,101,285 | 3/1992 | Kawai et al. | 358/471 |
| 5,172,279 | 12/1992 | Leib et al. | 359/806 |
| 5,187,595 | 2/1993 | Kitani et al. | 358/482 |
| 5,233,442 | 8/1993 | Kawai et al. | 358/482 |
| 5,272,548 | 12/1993 | Kawai et al. | 358/482 |
| 5,353,052 | 10/1994 | Suzuki et al. | 347/19 |

OTHER PUBLICATIONS

Patent Abstracts of Japan, vol. 95, No. 2, Mar. 31, 1995 & JP 06 328716 A (NEC Corp), Nov. 29, 1994, *abstract*.

Patent Abstracts of Japan, vol. 18, No. 55 (M–1550), Jan. 28, 1994 & JP 05 278227 A (Sharp Corp), Oct. 26, 1993, *abstract*.

Patent Abstracts of Japan, vol. 18, No. 452 (M–1661), Aug. 23, 1994 & JP 06 143608 A (Matsushita Electric Ind Co), May 24, 1994, *abstract*.

Patent Abstracts of Japan, vol. 14, No. 469 (M–1034), Oct. 12, 1990 & JP 02 188245 A (Canon Inc), Jul. 24, 1990, *abstract*.

*Primary Examiner*—Loha Ben

*Attorney, Agent, or Firm*—Fitzpatrick,Cella, Harper & Scinto

[57] ABSTRACT

A reading unit provided with an optical system mounted on a recording apparatus to read a source document includes a housing having the optical system in it, a light transmitting portion arranged on the outer surface of the housing of the reading unit in order to guide the light outside the reading unit into the optical system of the reading unit, and a protection member to cover the outer side of the light transmitting portion for opening and closing such portion freely. With the structure thus arranged, the reading unit is protected from ink mist and other particles created by the recording apparatus that may contaminate the reading unit, hence preventing the accuracy of reading signals from being lowered when reading is performed by means of this reading unit.

43 Claims, 20 Drawing Sheets

READING UNIT AND RECORDING APPARATUS CAPABLE OF MOUNTING SUCH READING UNIT THEREON

BACKGROUND OF THE INVENTION

1. Field of the Invention

The present invention relates to a reading unit detachably mountable on a recording apparatus, and a recording apparatus capable of mounting such reading unit on it.

2. Related Background Art

As a reading unit detachably mountable on a printing apparatus, there are conventionally a serial reading unit of the type that can be exchanged with a recording head mounted on the carriage of a printing apparatus, and a line reading unit that can be detachably mounted.

For the serial reading unit exchangeable with the recording head, no shutter mechanism is provided to protect the lens front of the optical reading system. Also, for the system that detachably mounts the line reading unit, no shutter of closing and opening type is provided to protect the lens and the light source, but a transparent plate or the like is arranged in front of the lens and the light source instead of the shutter.

The conventional detachable reading unit described above may often be located in a position other than the one regularly arranged for mounting because the unit should be made detachable. In this case, the front part of the lens is liable to collide with some other parts unexpectedly because no shutter mechanism is provided to protect the lens front. As a result, the image signals may sometimes become inaccurate for reading.

Also, for the detachable line reading unit having the transparent plate arranged to protect the lens and the light source, the transparent protection plate itself is damaged in some cases. If the palate is damaged, the image signals become inaccurate as in the case described above.

Further, in any one of the cases described above, the image signals may sometimes become inaccurate due to dust or other particles adhering to the lens or the transparent plate.

Also, an image reading device serving as a reading unit is generally provided with a plurality of light emitting elements and photodetecting elements. The light emitted from the light emitting elements illuminates the surface of a source document through light emitting fibers or the like, and then, the reflected light from the source document are received by the photodetecting elements through the light detecting fibers or the like, thus reading the source document.

Then, a control is arranged to determine the density of a source document, the so-called gradation, depending on the intensities of the light received by the photodetecting elements. Also, there is a method called binary control, which decides just on whether the representation is in black or in white without discriminating them finely in accordance with the densities.

As described above, it is necessary to determine the white portion on a source document as white and the black portion as black in accordance with the intensity of light received by the photodetecting elements, but there are some cases where the intensity of received light varies due to the variation or other causes that may exist among pluralities of light emitting elements and photodetecting elements to be used. If the intensity of received light should change, there is a possibility that white is read as black, and black as white. Then the contents that have been read are not the same as those of the source document.

Therefore, it is generally practiced that the white reference, called a white standard, whose reflective density is predetermined, is read in order to perform reading at a constant level at all times even if there are variations among the light emitting and photodetecting elements to be used, and that correction is made by the application of the white standard, thus enabling the intensity of the received light of the photodetecting elements to be recognizable as equal to that of the white standard.

Meanwhile, as recording methods adopted by recording apparatuses, there are, among others, ink jet method and wire-dot method, besides the thermal transfer method. Here, the ink jet method is such that recording is made by the recording head that does not touch the recording medium. With this method, a high speed recording is possible in high precision at lower noises. Therefore, the ink jet method is more in demand rapidly in recent years.

The ink jet recording method is structured to discharge ink droplets from the nozzles of the recording head for recording, and when the recording is at rest, the cap, which will be described later, is closely in contact with the surface of the recording head in order to prevent the nozzle unit of the recording head from being dried.

The recording head and the recording medium are arranged with a specific gap. At the time of recording, the ink droplets discharged from the nozzles of the recording head are caused to fly in the air in such specific gap. Images are formed when such ink droplets arrive at the recording medium.

Also, even at the time of recording, if a specific period of time elapses, while waiting for the data to be received, so that there is no discharge even after such period of time, the recording head is driven to move to the capping position. Then, predischarge is executed to prevent the nozzles of the recording head from being dried by discharging ink droplets into the cap. In this case, should the cap abut upon the recording head, the position of the recording head varies. This variation may disturb images when the next recording is performed. Therefore, the cap is arranged at a location away from the recording head at a certain distance. The predischarge is conducted toward the inside of the cap under such circumstance. As a result, the ink droplets fly in the air in this case, too, as at the time of recording.

It is ideal to discharge each of the ink droplets from the recording head in one mass. Actually, however, the discharged ink droplet may often be divided into one main droplet for the formation of an image on a recording medium, and a plurality of small ink droplets called ink mist, which is not related to the formation of any images.

The flying direction of the mist described above does not necessarily agree with that of the main droplet. Also, if the ink droplet is extremely small, the mist is caused to float in the recording apparatus to adhere to various parts in the interior of the apparatus.

Also, there are some cases where a main droplet is caused to bounce up the moment it arrives at a recording medium or the cap described earlier, and becomes floating mist, too.

Therefore, when an image reading device is integrally arranged on a carriage as described above, the reading unit of such image reading device is contaminated by the aforesaid mist, making it impossible to carry on image reading accurately.

SUMMARY OF THE INVENTION

The present invention is designed in consideration of the problems described above. It is an object of the invention to provide an image reading unit capable of preventing the reading accuracy from being lowered by avoiding any contamination or damage that may be given to the optical system to be used for reading.

It is another object of the invention to provide a recording apparatus having an image reading function usable in an excellent precision without causing the reading portion of the image reading unit to be stained with ink.

It is still another object of the invention to provide a recording apparatus having an image reading function capable of easily performing highly precise white corrections without causing the operator to exercise any extra manual work, and also, without causing the white standard sheet to be stained with ink.

It is a further object of the invention to provide an ink jet recording apparatus capable of arranging an image reading unit integrally with an ink jet recording head in the interior of the apparatus, while preventing the reading portion of the image reading unit from being stained with ink droplets or the like.

It is still a further object of the invention to provide a reading unit having an optical system mounted on a recording apparatus to read a source document, which includes the following:

a housing having the optical system in it;

a light transmitting portion arranged on the outer surface of the housing of the reading unit in order to guide the light outside the reading unit into the optical system of the reading unit; and a protection member to cover the outer side of the light transmitting portion for opening and closing such portion freely.

It is another object of the invention to provide a recording apparatus provided with traveling means for causing an image reading device having an image reading portion for reading a source document and a recording head for recording images on a recording medium to move relatively with respect to a source document or a recording medium, which includes a covering member to shield the reading portion of the image reading device when reading is at rest.

It is still another object of the invention to provide an ink jet recording apparatus provided with traveling means for causing an image reading device having an image reading portion for reading a source document and a recording head for recording images on a recording medium to move relatively with respect to a source document or a recording medium, which includes the following:

coupling means for detachably mounting the image reading device on the traveling means; and a covering member to shield the reading portion of the image reading device when reading is at rest; here the covering member being arranged to part from the reading portion of the image reading device when reading is executed, at the same time, the image reading device being mounted on the traveling means by use of the coupling means.

It is a further object of the invention to provide a recording apparatus capable of recording on a recording medium by the application of an ink jet recording method, and of reading a source document at the same time, which includes the following:

a carriage having an ink jet recording head mounted on the carriage for discharging ink onto the recording medium, at the same time, having mounted on the carriage a reading head with an aperture on the surface opposite to the source document for reading it, and reciprocating in the main scanning direction while maintaining a given gap with respect to the recording medium; and a shutter mounted on the carriage and arranged to move between the releasing position and the closing position with respect to the aperture, this shutter being able to shut off the optical components included in the reading head from the outside atmosphere by closing the aperture.

Other objectives and advantages besides those discussed above will be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 26A shows the state where the carriage is positioned on the shutter closing extrusion side; and FIG. 26B the state where the carriage is positioned on the,shutter opening extrusion side.

DETAILED DESCRIPTION OF THE PREFERRED EMBODIMENTS

Hereinafter, with reference to the accompanying drawings, the description will be made of embodiments in accordance with the present invention.

Figure 1:
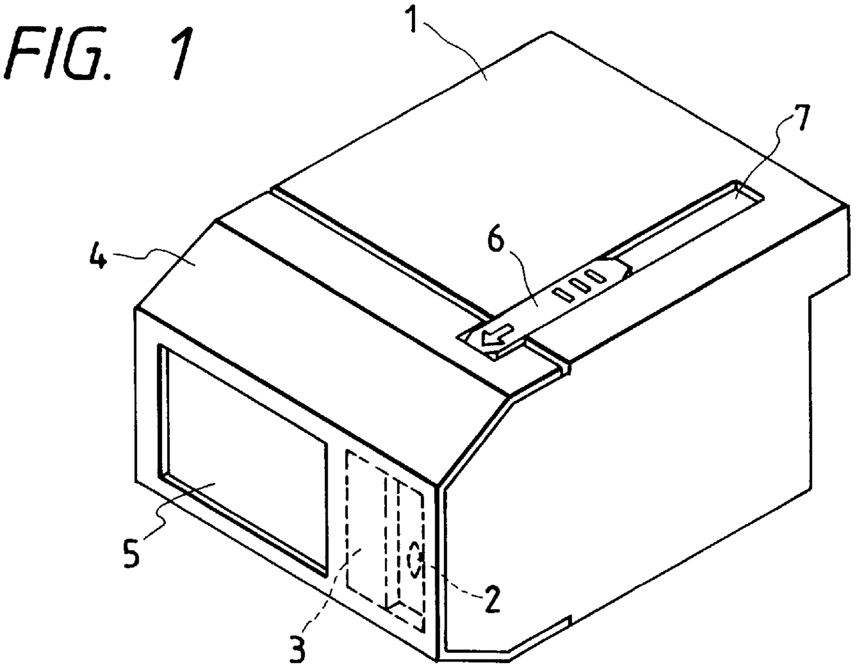
FIG. 1 is a perspective view which shows the outer appearance of a reading head cartridge in accordance with a first embodiment of the present invention.
Figure 2:
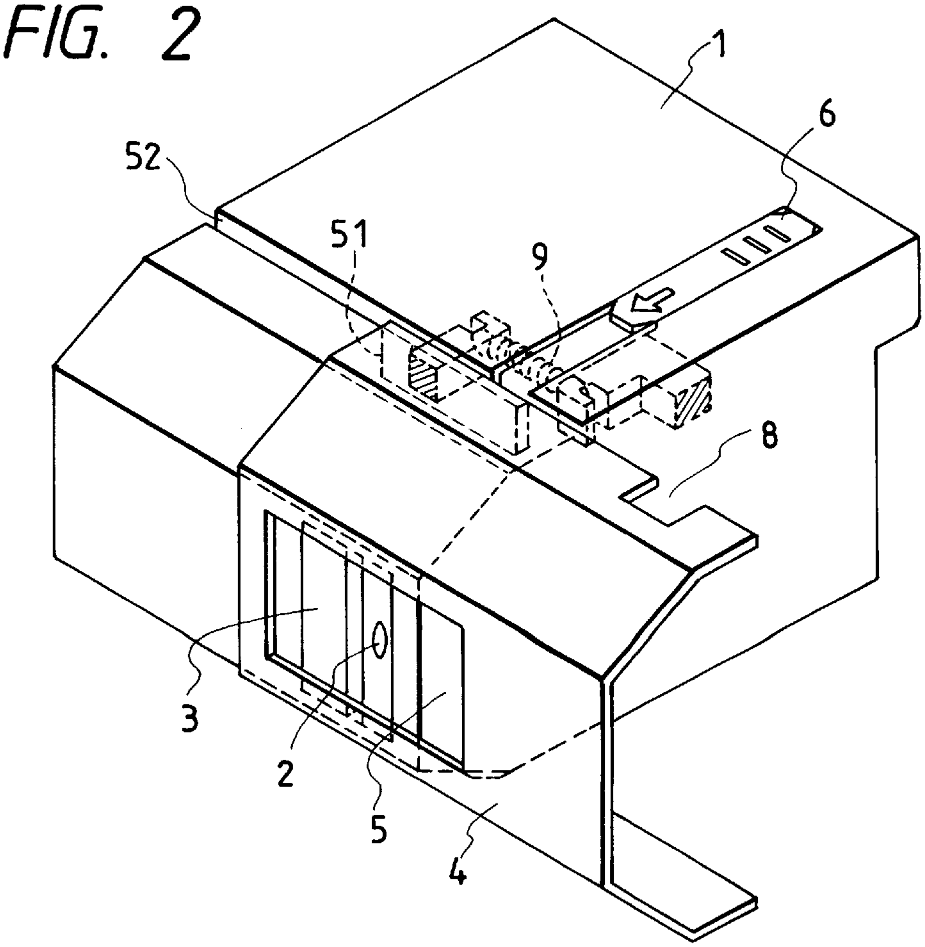
FIG. 2 is a perspective view which shows the outer appearance of the reading head cartridge represented in FIG. 1.
Figure 3:
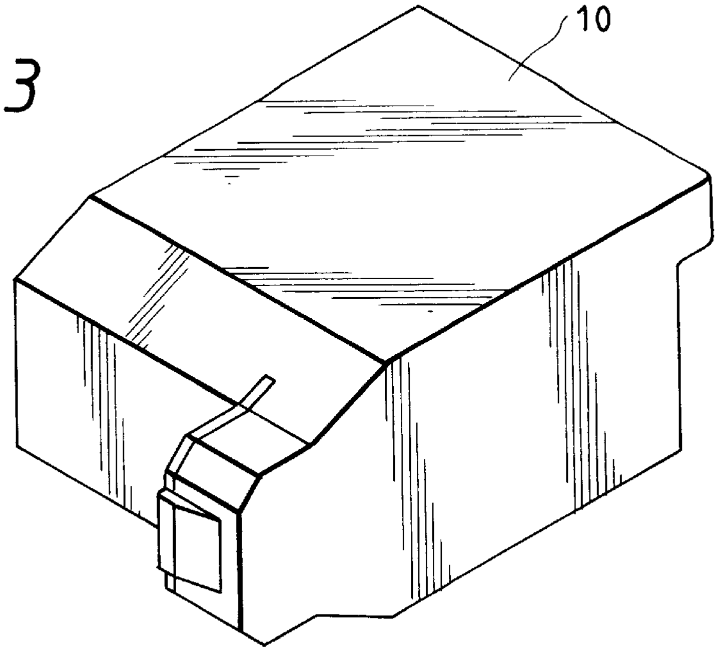
FIG. 3 is a view which shows the outer appearance of a recording head cartridge.
Figure 4A:
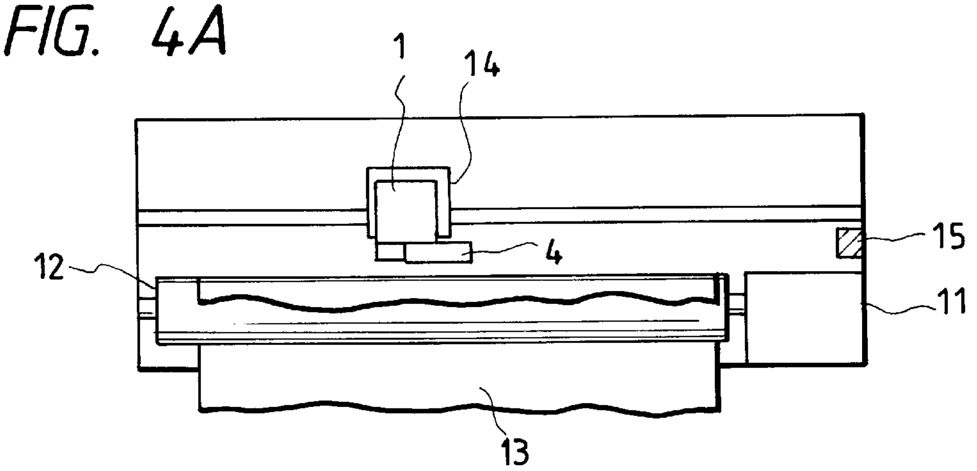
FIGS. 4A and 4B are views which illustrate the state where a reading head cartridge is mounted on a printing apparatus, respectively.
Figure 4B:
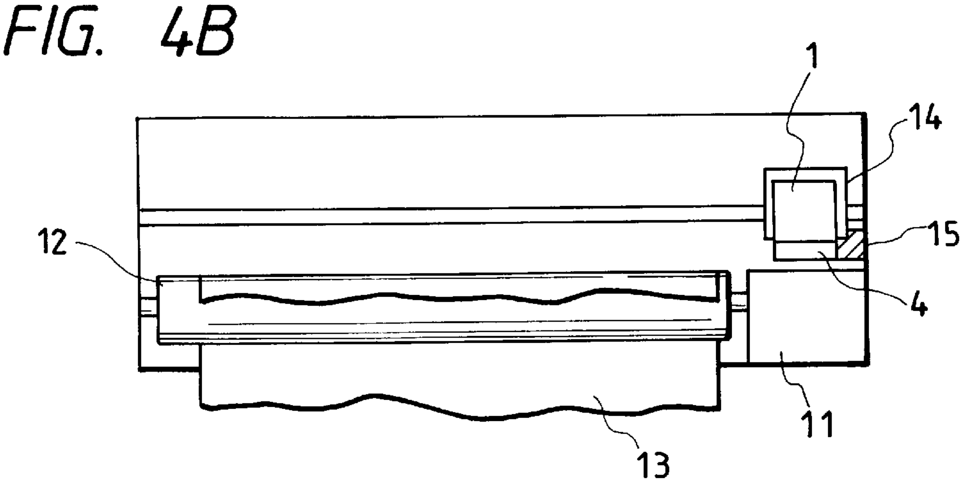

FIG. 1 and FIG. 2 are perspective views showing the outer appearance of a reading head cartridge in accordance with a first embodiment of the present invention when the reading head cartridge is demounted from a recording apparatus, such as a printer, and when it is mounted on the apparatus, respectively. FIG. 3 is a perspective view which shows the outer appearance of a recording head cartridge to be mounted on a printing apparatus exchangeably with the present embodiment. FIGS. 4A and 4B are upper surface views showing the operation of an ink jet printing apparatus capable of mounting the present embodiment on it; the views illustrate such apparatus at the time of having an image reading head cartridge mounted thereon.

In FIG. 1 and FIG. 2, a reference numeral 1 designates an image reading head cartridge; 2, a lens; 3, a light source; and 4, a protective cover. The reading head cartridge 1 functions as a reading device when it is replaced with a recording head cartridge 10 (see FIG. 3) mounted on a carriage 14 (see FIGS. 4A and 4B). Therefore, the reading head cartridge 1 is configured similarly as the recording head cartridge 10 so that it can be mounted on the carriage 14 without a hitch in the same way as the latter. Thus it is possible for the reading head cartridge 1 to perform reading by means of the carriage 14 that travels as in recording and a roller 12 that feeds a source document to be read as in feeding a recording paper sheet.

As described earlier, a structure is generally adopted for an image reading device to illuminate the surface of a source document by means of a light source for illumination, such as LED, and then, to read the reflected images of the source document by means of a sensor (not shown) through a lens. However, if a printer is used as a reading device, the same parts, which are used for recording by the printer, are read by the reading unit. Therefore, a problem is encountered that the lens and the light source are stained by the adhesion of ink and dust particles, thus lowering the functions thereof or, in the worst case, causing the lens and light source to fail completely to function.

In the present embodiment, too, the same method as described above is adopted for the optical system for reading use. However, a protective cover 4 is arranged to solve the aforesaid problem. Hereunder, the description will be made of the structure of the present embodiment including the function of the protective cover 4.

The protective cover 4 is to shield the front part where the lens 2 and the light source 3 are arranged to constitute the optical system of the reading head cartridge 1 for reading use. As shown in FIG. 2, on the edge portion to shield the front part, a partly bent portion 51 is inserted into a protective cover installation groove 52 integrally formed with the reading head cartridge 1. This portion is arranged to slide in the protective cover installation groove 52. The bent portion 51 is coupled with the reading head cartridge 1 by means of a coupling member, a spring 9 or other elastic member in the reading head cartridge 1. The protective cover 4 is biased by the spring 9 to be pushed outwardly on the side of the reading head cartridge 1 as shown in FIG. 2.

For the protective cover 4, an aperture 5 is arranged. The protective cover 4 is structured to be opened by means of the spring 9 to the position where the lens 2 and the light source 3 can be externally exposed through the aperture 5. In this way, it is possible to perform reading by use of the reading head cartridge 1 as illustrated in FIG. 2 and FIG. 4A.

Also, when the reading head cartridge 1 moves to the position of the recovery device 11 of the recording head cartridge to recover the ink discharge function, which is arranged for the printer main body, the side face portion of the protective cover 4 abuts upon a stopper 15 provided for the side face of the recording portion of the printer main body. Thus the protective cover 4 is pushed back to the inner side of the reading head cartridge 1 as shown in FIG. 1 and FIG. 4B. In this state, the protective cover 4 completely shields and hides the lens 2 and the light source 3.

For the present embodiment structured as described above, the protective cover 4 enables the optical system for reading use to be released while the reading head cartridge 1 performs reading. When the reading head cartridge moves to the position of the recovery device 11 where no reading is conducted, the protective cover completely shields and hides the optical system for reading use. Therefore, there is no possibility that the optical components are damaged or contaminated by the presence of the recovery device 11 and ink splashing, hence making it possible to prevent the reading accuracy from being lowered.

Now, the description will be made of the state where a reading head cartridge 1 of the present embodiment is in storage.

When the reading head cartridge 1 is demounted from the printer and the printer is not used as reading means, it is necessary to protect the optical system for reading use. As described above, the protective cover 4 is usually in the state that it is pushed outwardly by the function of the spring 9 to the side of the reading head cartridge 1. As a result, the optical system for reading use is externally exposed inevitably.

For the reading head cartridge 1 of the present embodiment, the stopper 6 is provided to maintain the protective cover 4 to be in a state of shielding the optical system for reading use. Also, a stopper groove 7 on the main body side (a first groove) and a stopper groove 8 on the protective cover side (a second groove) are provided (see FIG. 1 and FIG. 2).

The stopper groove 7 on the main body side is provided for the main body of the reading head cartridge 1, while the stopper groove 8 on the protective cover side is provided for the protective cover 4. These grooves are arranged respectively on the locations whose edges are substantially met in a state to shield the optical system for reading use, which comprises the lens 2 and the light source 3 as shown in FIG. 1. Also, the stopper 6 is slidably set in the stopper groove 7 on the main body side so as to freely protrude to the protective cover 4 side.

To demount the reading head cartridge 1 from the printer, the user manually presses back the protective cover 4 to the position where it shows the state as illustrated in FIG. 1. Then, the stopper 6 arranged for the reading head cartridge 1 main body is allowed to slide in the stopper groove 7 on the main body side to insert the stopper 6 into the stopper groove 8 on the protective cover side, hence fixing the protective cover 5 in the position to shield the optical system for reading use.

In accordance with the present embodiment described above, the protective cover 4 is fixed by means of a stopper to protect the optical system for reading use even when the reading head cartridge 1 is demounted from the printer. Therefore, no damage is given to the optical components. Moreover, since the protective cover 4 serves as a storage box, it contributes to obtaining an easier handling of the reading head cartridge.

In this respect, it may be possible to arrange the structure to reverse the biasing direction of the spring 9 so that the protective cover 4 is biased in the closing direction at all times. Thus, the protective cover 4 is brought to the released state by use of the stopper 6 when reading is performed. Also, it may be possible to arrange the mode of the reading unit as the one of the so-called line type where it has a length substantially equal to the width of a source document or a recording medium.

Since the present embodiment is structured as described above, it is possible to demonstrate the effects given below.

When reading is performed, the protective cover is opened, and it is closed when it approaches the recovery device. In this way, the reading portion is prevented from being damaged due to ink and dust particles, thus demonstrating the effect to avoid lowering the reading accuracy efficiently.

When a reading head cartridge is demounted from a printer and left as it is, the protective cover serves to protect the reading portion, and also, serves as a storage box. Also, should the reading head cartridge be stored in the storage box of a recording head cartridge by mistake, there is no possibility that it is stained by ink because its reading portion is shielded by the protective cover. In addition to this effect, this covering arrangement makes it easier to handle the reading head cartridge.

Figure 5:
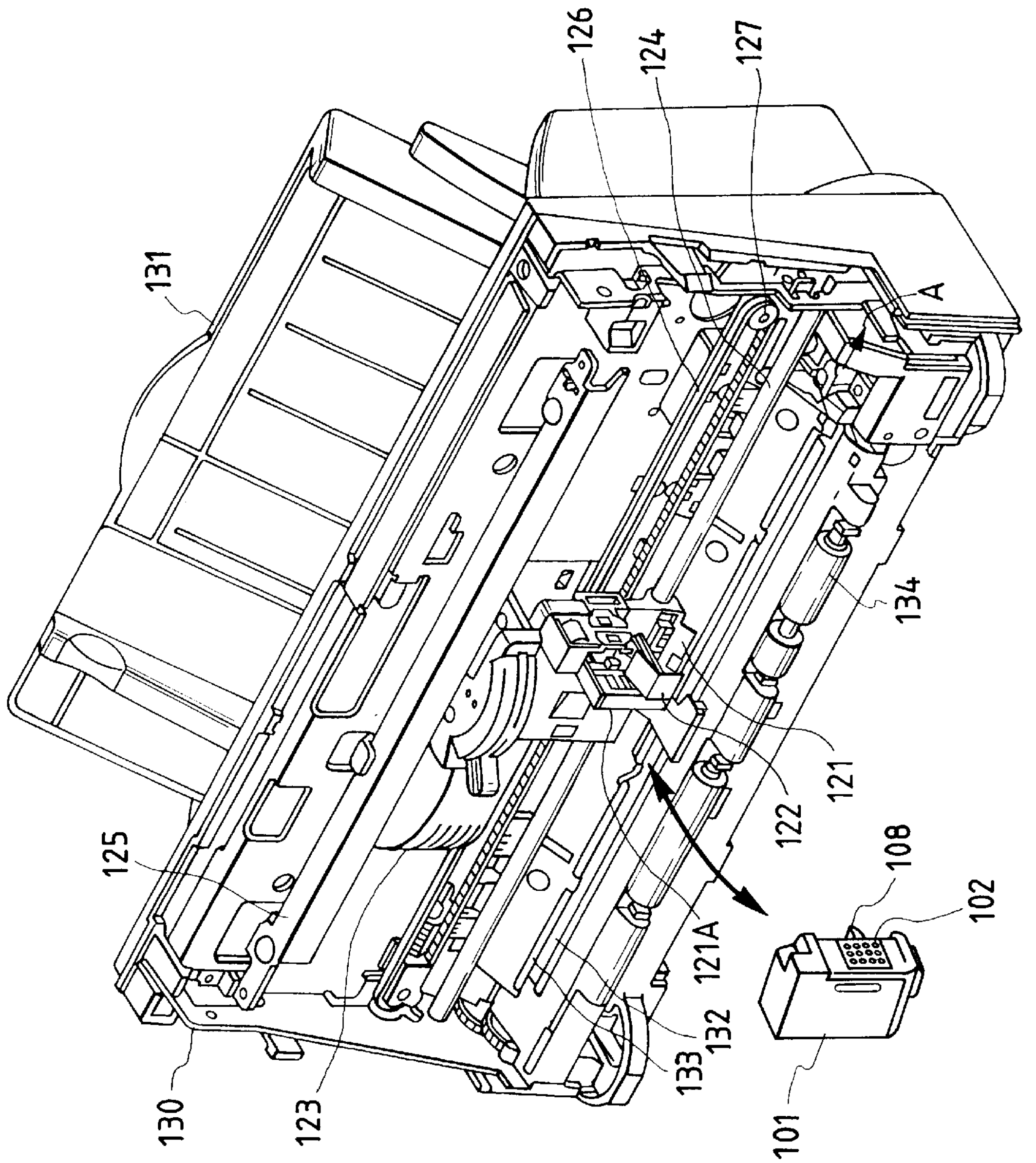
FIG. 5 is a perspective view which shows the states of a reading unit attached to or detached from the main body in accordance with a second embodiment of the present invention.
Figure 6:
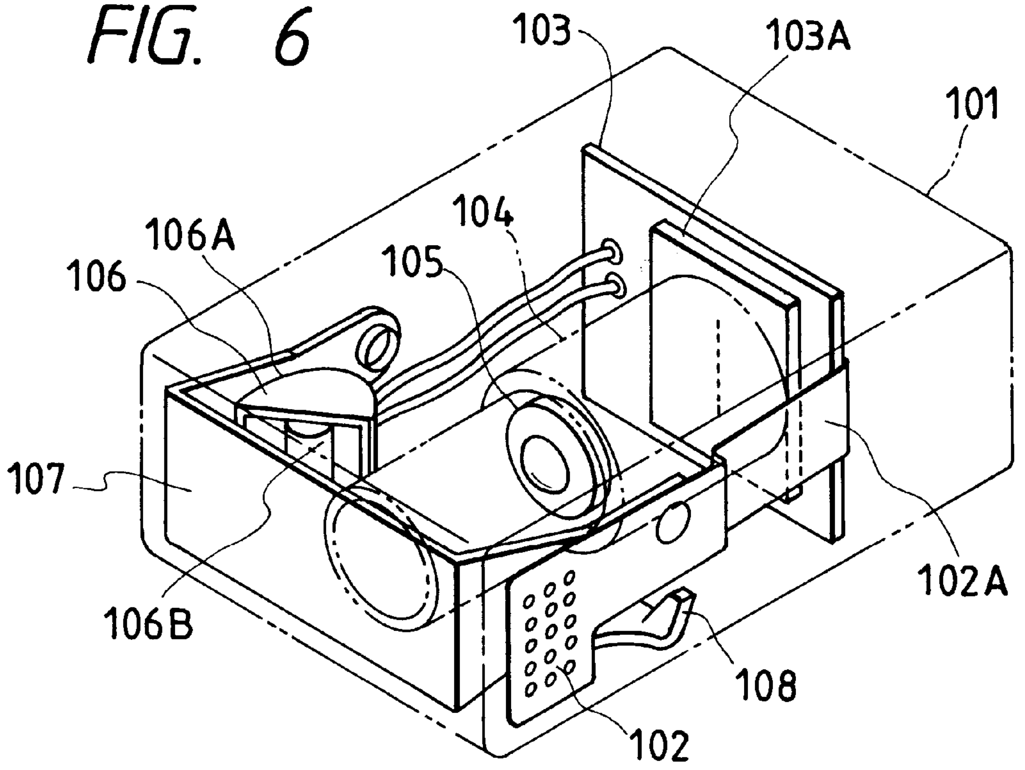
FIG. 6 is a perspective view which shows the inner structure of an optical system of the embodiment represented in FIG. 5.
Figure 7:
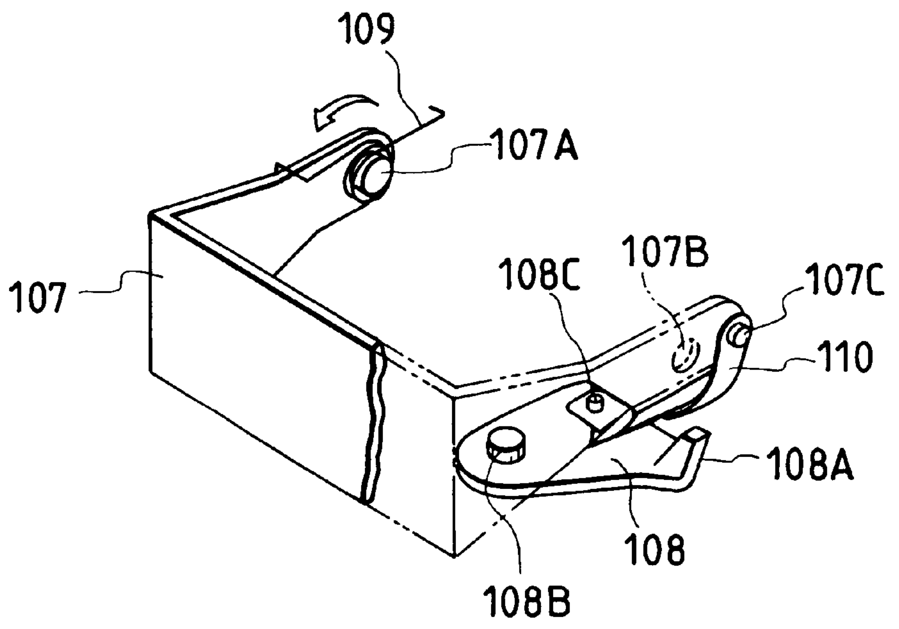
FIG. 7 is a perspective view which schematically shows the structure of a shutter unit of the embodiment represented in FIG. 5.

FIG. 5 to FIG. 8 are perspective views showing the structure of a reading unit in accordance with a second embodiment of the present invention. The present embodiment is a reading unit that can be detachably mounted on a printer for a recording apparatus or the like. FIG. 5 is a view which shows the state where it is installed on the printing apparatus main body. FIG. 6 is a view which shows the inner structure of the optical system of the reading unit. FIG. 7 is a view which shows the structure of the shutter portion of the reading unit.

In FIG. 5, a reference numeral 101 designates an exchangeable reading unit of a serial type that can be detachably mounted. This unit is configured to be substantially the same as the recording head for printing use so that it can be mounted exchangeably with the recording head in its mounting position on the carriage. A junction 102, which is configured to be common to the recording head, is also provided for the electrical connection with the main body.

A reference numeral 121 designates a carriage that mounts on it the reading unit 101 and a recording head (not shown), and moves when reading is performed. For the carriage 121, a junction 121A is provided to transmit and receive reading control signals or the like from the main body through the junction 102 of the reading unit 101. The carriage 121 and the reading unit 101 are coupled and fixed reliably by the rotation of a lever 122. The reading signals are processed by a CPU (not shown) of the apparatus main body by way of a flexible cable 123 through the junction 121A. The carriage 121 reciprocates between the side boards 130 along the sliding shaft 124 and sliding plate 125 in order to operate reading. A reference numeral 127 designates a driving motor to move the carriage 121 through a belt 126; and 131, a sheet supply stacker for feeding each of the source documents therefrom: here, recording paper sheets are also stacked on it when the apparatus is used as a printer.

A source document is carried by means of an LF roller 132 and a sheet pressure roller 133 form the sheet supply stacker 131 to the reading position of the reading unit 101 mounted on the carriage 121. While being intermittently line fed by a portion of reading width, the source document is lastly exhausted by means of a sheet exhaust roller 134.

FIG. 6 is a view which shows the inner structure of the reading unit 101. A reference numeral 102 designates a junction for transmitting reading signals to the main body side. The end portion of the extension formed by a flexible cable 102A is connected to the substrate 103 on which a reading sensor 103A is arranged.

In this respect, the reading sensor 103A comprises a plurality of reading elements (not shown) arranged within a given width. On the front part thereof, there are provided a lens 105 and a lens barrel 104 that supports the lens 105. Here, the aforesaid width is assumed to be the same as that of the recording elements of a recording head to be mounted on the carriage 121. The optical reading operation is conducted by feeding a source document intermittently by a given portion equivalent to the width in which a plurality of reading elements are arranged, while the carriage 121 is caused to travel in the width direction of recording sheet as in the case of recording being performed.

A reference numeral 106 designates a light source for illuminating the surface of a source document. It is structured by a reflector 106A and a lamp 106B in order to increase the luminous energy. The light that has illuminated the surface of the source document is reflected therefrom and arrives at the reading sensor 103A after passing the lens 105 in the lens barrel 104. A plurality of reading sensors 103A, which are vertically arranged, transmit the reading signals to the apparatus main body side as voltage changes.

Between the case of the reading unit 101 and the lens barrel 104, a shutter 107 is rotatively provided in order to protect the lens 105 and the light source 106. On the lowest part of the case 101, a lever 108 is arranged to engage with the carriage 121 and transfer the rotational motion of the shutter 107 when the case is mounted on the carriage 121 (see FIG. 5). This lever is configured to protrude to the side of the case 101 from the external form thereof.

FIG. 7 is a view which shows the structure to open and close the shutter 107. On both edge portions of a U-letter shaped shutter 107, rotational pivots 107A and 107B are provided, and fitted over the rotational shafts (not shown) formed on the case of the reading unit 101, which are configured to agree with the pivots, thus making it possible to rotate the shutter 107 smoothly. A reference numeral 109 designates a torsion spring wound around the rotational pivot 107A to give a force to rotate the shutter 107 in the direction indicated by an arrow in FIG. 7. For a lever 108, a pivot 108A is provided, which is fitted into a pivotal hole (not shown) on the case of the reading unit 101. The lever rotates around it. A reference numeral 110 designates a coupling sheet. One end 107C of this sheet is coupled to anti-shutter 107 side centering on the rotational pivot 107B of the shutter 107. The other end 108C is coupled to the lever 108. The coupling sheet 110 is formed by flexible resin such as PET. This sheet winds around the outer side of the coupling portion of the case of the reading unit 101 to connect the shutter 107 and the lever 108.

Figure 8:
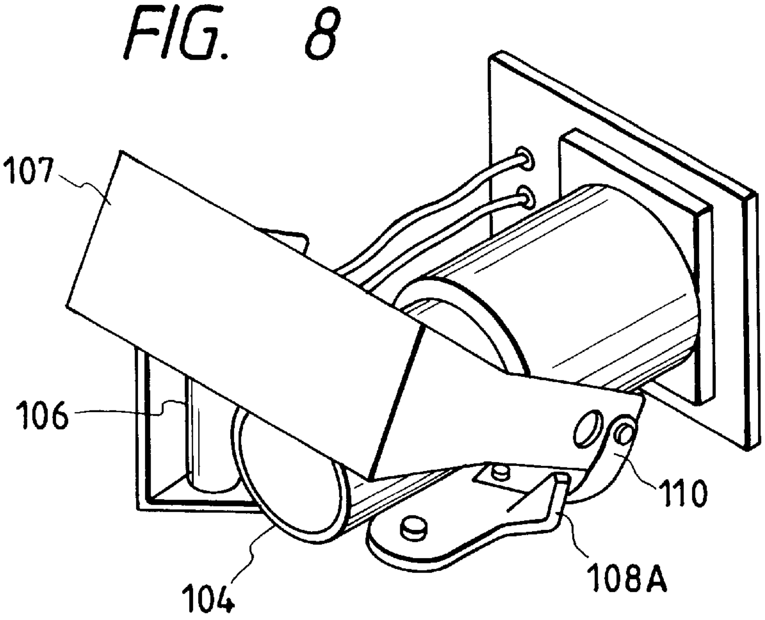
FIG. 8 is a perspective view which shows the releasing state of the shutter of the embodiment represented in FIG. 5.

FIG. 8 is a view which shows the state where the shutter 107 is open. Now, when the reading unit 101 is mounted on the carriage 121, the coupling portion 108A residing between the lever 108 and carriage 121 is caused to rotate so as to be pressed into the case of the reading unit 101. Through the coupling sheet 110, this rotation gives a rotational force in the direction opposite to the direction in which the torsion spring 109 biases the shutter 107. In this way, the shutter 107 rotates to enable the light source 106, the lens barrel 104, and the lens 105 to be exposed with respect to the surface of a source document, hence making it possible to conduct its reading operation.

Figure 9:
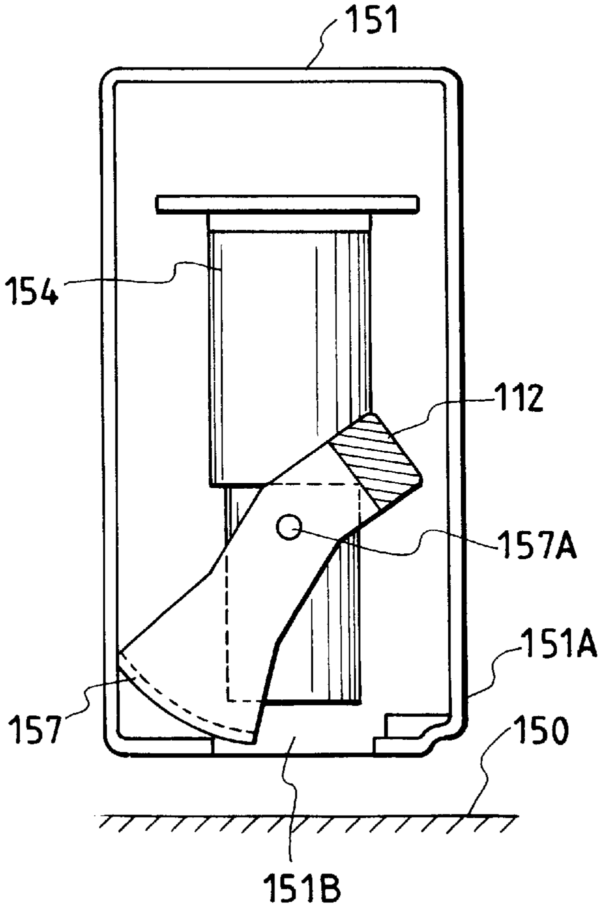
FIG. 9 is a cross-sectional view which shows the structure in accordance with a third embodiment of the present invention.
Figure 10:
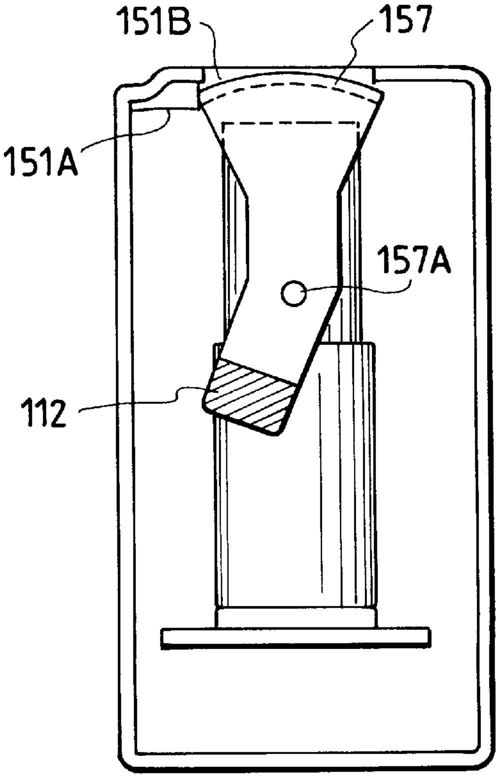
FIG. 10 is a cross-sectional view which shows the structure of the embodiment representing in FIG. 9.

FIG. 9 and FIG. 10 are cross-sectional views showing schematically the structure of a third embodiment in accordance with the present invention.

FIG. 9 shows the state where the present embodiment is mounted on a carriage 121 and vertically positioned above the surface of a source document 130.

On the lens barrel 154 installed in the reading unit 151, a shutter 157 is fixed to protect a light source, a lens, and others in the lens barrel 154. The shutter 157 is U-letter shaped to release or shield the releasing end of the lens barrel 154 when rotating in the same way as the shutter 107 represented as the second embodiment. The rotational pivot 157A and weight 121 are integrally formed. The shutter 157 and the weight 121 make an angle of 90 degrees or more and 180 degrees or less centering on the rotational pivot 157A. Further, the weight 121 is formed to be much heavier than the shutter 157. On the location opposite to the aperture end of the case of the lens barrel 154 of the reading unit 151, an aperture 151B is arranged. Also, in the interior near the aperture 151B, a stopper 151A is provided to stop the shutter 157 in order to regulate its rotational angle.

In accordance with the present embodiment structured as described above, when the reading unit is mounted on the carriage 121 so as to direct the aperture 151B vertically downward as shown in FIG. 9, the shutter 157 rotates around the pivot 157A to the position where the shutter 157 is in contact with the case of the reading unit 151, thus releasing the lens barrel 154 and the light source installed in the lens barrel 154 being open to the outside.

FIG. 10 is a cross-sectional view showing the state where the reading unit 151 is demounted from the apparatus main body, and the aperture 151B is directed vertically upward. In this state, the shutter 157 rotates around the pivot 157A by the function of the weigh t 112. The aperture 151B is closed when th e shutter 157 rotates and stops at the position where it is in contact with the stopper 151A formed inside the case of the reading unit 151 near the aperture 151B.

Here, in accordance with the second and third embodiments described above, the shutter is structured to be automatically open by its mechanical motion when it is installed on the main body, but it may be possible to provide the reading unit with detection means and an actuator to open the shutter when its installation is confirmed by the detection means, thus electrically opening and closing the shutter instead. Further, it may be possible to arrange the structure so that the user of the apparatus for which the units should be exchanged can open and close the shutter manually.

Also, the mode of the reading unit may be a reading sensor of the so-called line type that has a length substantially equal to the width of a source document or a recording medium.

Since the second and third embodiments are structured as described above, it is possible to demonstrate the effects given below.

The degradation of optical system for reading use due to the protection of lens and the accumulation of dust particles can be prevented, and also, the structure is arranged to make it possible to operate reading without any intervention of protective means. Therefore, reading is possible even when the protective means are damaged. In this way, the inaccuracy of reading signals can be prevented effectively.

Also, interlocked with mounting to and demounting from the carriage, the shutter operates to be opened or closed. This arrangement contributes to improving the operativity of the device significantly for its user.

Further, the sequence of the recording operation can be repeated for the reading operation. Therefore, a recording apparatus can be fabricated in a simpler structure.

Figure 11:
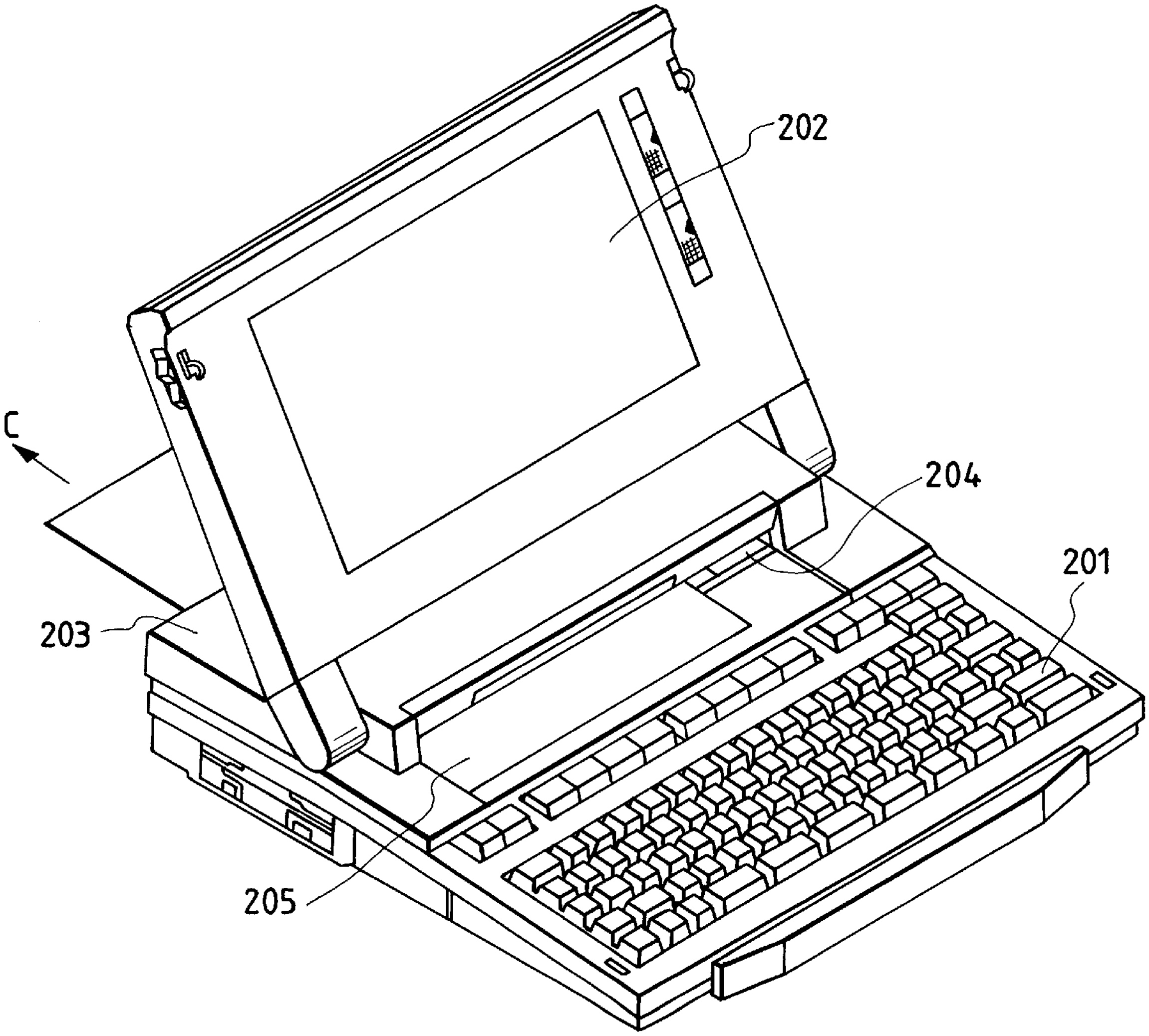
FIG. 11 is a perspective view which shows the outer appearance of a word processor, which is one embodiment of an ink jet recording apparatus in accordance with a fourth embodiment of the present invention.

Now, with reference to FIG. 11, the description will be made of the external structure around the carriage of an ink jet recording apparatus, which is a fourth embodiment in accordance with the present invention. FIG. 11 is a perspective view which shows the outer appearance of a word processor as one embodiment of the ink jet recording apparatus.

The ink jet recording apparatus of the present embodiment is used for a word processor as shown in FIG. 11, for example, which comprises a keyboard 201 for inputting information; an indication unit 202 mainly formed by liquid crystal or the like for displaying information; and a recording apparatus (printer) 203 serving as the apparatus main body for recording on a sheet inserted from an aperture 204 and exhausted in the direction indicated by an arrow C in FIG. 11. The indication unit 202 is rotatively held. When the apparatus is not in use, this unit can be folded over the keyboard unit 201.

Figure 12:
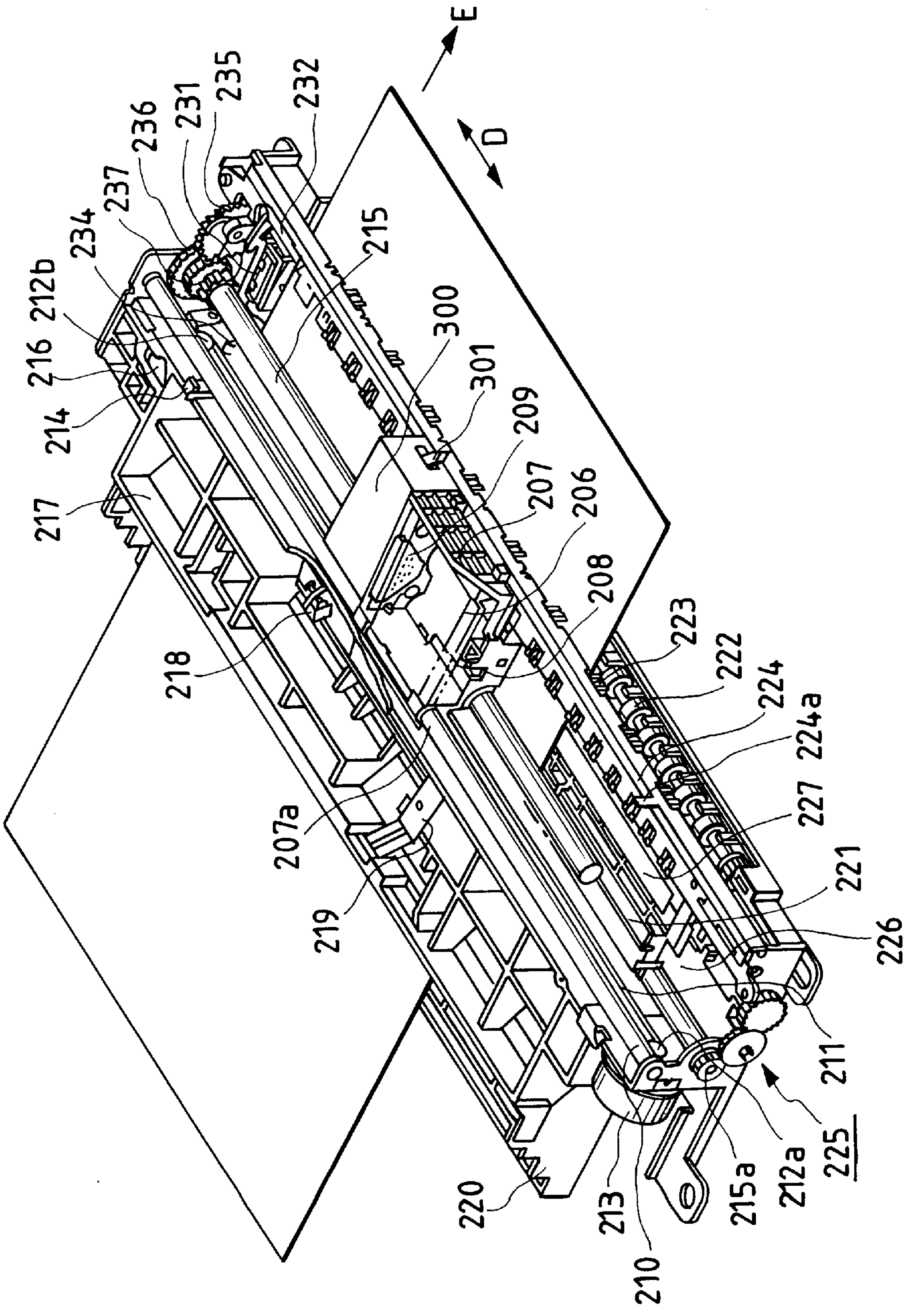
FIG. 12 is a perspective view which shows the outer appearance of the circumference of a carriage of the apparatus represented in FIG. 11.

FIG. 12 is a perspective view which shows the inner structure of the ink jet recording apparatus represented in FIG. 11.

For the ink jet recording apparatus shown in FIG. 12, a recording head cartridge 206 having an ink jet recording head in it, and a carrier 207 are provided. The carrier scans in the directions indicated by arrows D in FIG. 12 with a recording head cartridge 206 being mounted on the carrier. Also, a supporting plate 209 is provided to support an electrical connector for the recording head cartridge 206.

For the carrier 207, a hook 208 is provided to install the recording head cartridge 206. Through the bearing 207*a* of the carrier 207, a guide shaft 210 is penetrated in order to guide the carrier 207 in the directions indicated by arrows D. The carrier 207 is fixed to a timing belt 211 that transmits the driving force to the carrier to travel in the directions D. The timing belt 211 is tensioned around the pulleys 212*a* and 212*b* arranged on both sides of the apparatus, respectively.

One of the pulleys 212*a* is directly connected with a carrier motor 213 to transmit the driving force, thus enabling the carrier 207 to travel in the directions D. Also, in order to detect the position of the carrier 207 in the directions D, a HP (Home Position) sensor 214 is provided.

A feed roller 215 is provided for regulating the recording surface of a recording medium, such as a resin sheet or paper sheet (hereinafter referred to as a recording sheet), at the same time, feeding the recording sheet when recording is performed. The feed roller is driven by means of a feed motor 216.

An upper guide 217 is provided to support the HP sensor 214, a sheet sensor 218 for detecting the position of a recording medium in the feeding direction (direction indicated by an arrow E in FIG. 12), and an electric supply member 219 for use of an optional automatic sheet feeder (not shown), and at the same time, this guide conducts the recording medium from the insertion inlet to the recording position. Also, a lower guide 220 is provided to guide the recording medium to the recording position as in the upper guide 217. On the feeding path of the recording medium, a pinch roller 211 is arranged to press the recording medium toward the feed roller 215 for carrying it on. On the downstream side of the recording position in the feeding direction of the recording medium, a sheet exhaust roller 222 is arranged to exhaust the recording medium toward a sheet exhaust outlet (not shown). Facing the sheet exhaust roller 222, a spur 223 is arranged. The sheet exhaust roller 222 is pressed to be in contact with the spur 223 by means of a spring (not shown) in order to give a carrying force to the recording medium. The spur 223 is supported by a guide rail 224, which also supports the carrier 207. Also, for the guide rail 224, an extrusion 224*a* is arranged to abut upon the switching lever of an image reading device to be described later.

Also, it is arranged to drive the sheet exhaust roller 222 by means of a gear 215a and a gear train 225 fixed to one end of the feed roller 215, which transfer the rotation of the feed roller 215.

The pinch roller 221, sheet exhaust roller 222, and others are supported by a platen 226. On the platen 226, a white standard plate 227 is fixed.

In the home position, a cap 231 formed by rubber or some other elastic material is arranged to face the ink discharge port formation surface of a recording head, and supported to be able to be in contact with or to part from the recording head. This cap 231 is used to protect the recording head when recording is at rest or used as an ink receptacle when the discharge recovery process is conducted for the recording head.

In this respect, the term "ink receptacle" referred to in the specification hereof is not necessarily limited to meaning the cap described above, but any other vessels that may be able to receive ink exhausted from the recording head irrespective of the modes thereof. In the present specification, the term "(discharge) recovery process" means the process in which air bubbles, dust particles, ink becoming too viscous to be fit for recording, and any other causes that may make ink discharges defective are removed by discharging ink from all the discharge ports by driving the energy generating elements arranged inward the ink discharge ports, which are utilized to discharge ink, or by enabling suction force to act while the discharge port formation surface is covered by the cap, or by some other means.

For this apparatus, a pump 232 is provided as suction means for generating suction force for conducting compulsory suction of ink or for sucking ink received by the cap 231 when a discharge recovery process is executed by the application of such compulsory suction or predischarge.

Also, a blade 233 for wiping the discharge port formation surface of the recording head is movably supported between a position where the blade can protrude to the recording head side for wiping while the head travels, and a position where the blade is retracted so as not to engage with the discharge port formation surface.

The blade 233 is arranged to move by means of a latch 234 along the traveling of carrier 207 between the wiping position and the retracting position.

To the feed roller 215, a roller gear 236 and trigger gear 237 are fixed. A pump gear 235 having a cam surface to drive the pump 232 engages with the feed roller so that when the trigger gear 237 abuts upon to engage with the roller gear 236 by means of the carrier 207, the rotation of the feed roller 215 is transferred to the pump gear 235.

Also, to the carrier 207, an image reading device 300 is fixed to move integrally with the carrier 207. Further, a switching lever 301, which will be described later, is rotatively fixed to the image reading device 300.

Now, the recording head cartridge 206 will be described in detail.

Figure 13A:
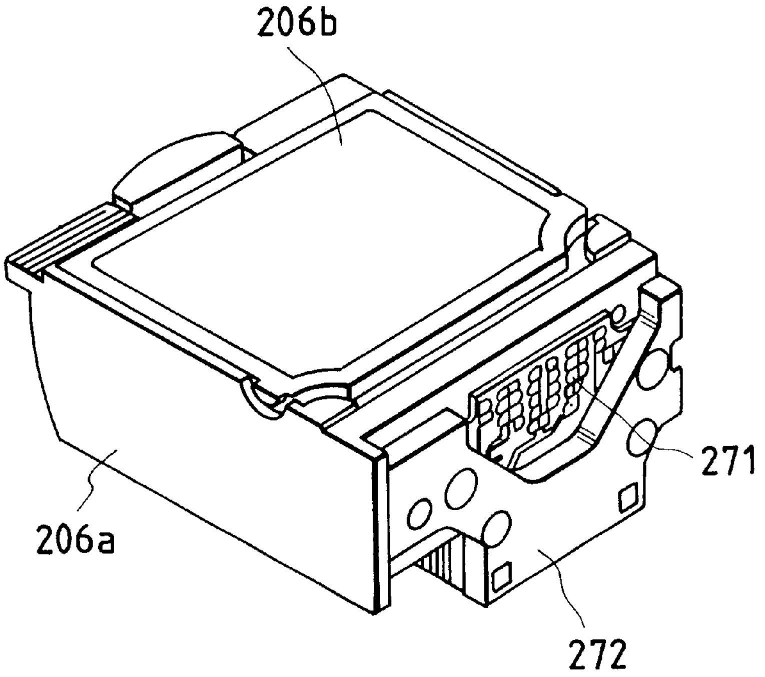
FIGS. 13A and 13B are perspective views showing the outer appearance of a recording head cartridge to be used for the recording apparatus represented in FIG. 12, respectively.
Figure 13B:
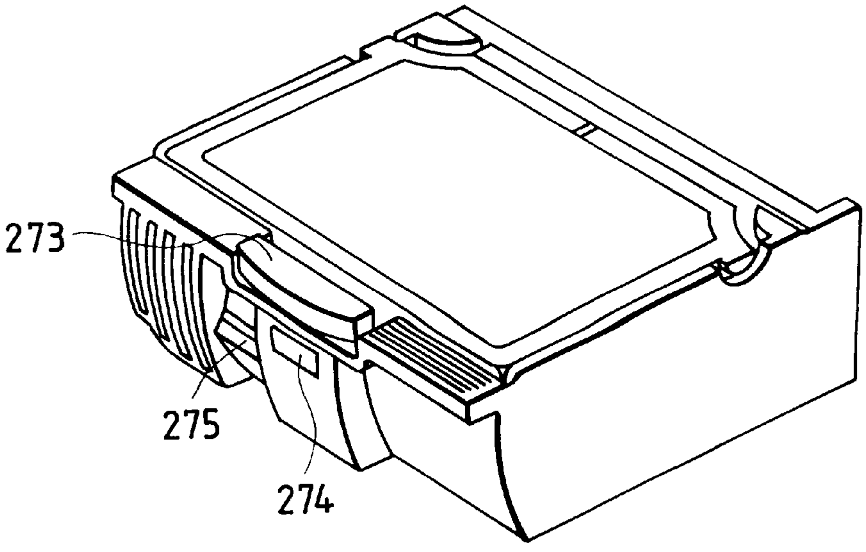

FIGS. 13A and 13B are perspective views showing the outer appearance of a recording head cartridge 206 that comprises a discharge unit 206*a*, which is the main body of an ink jet recording head, and an ink tank 206*b* detachably mountable on the discharge unit 206*a*.

As shown in FIG. 13A, the recording head cartridge 206 is provided with an electrical connector 271 and nozzles 272 for discharging ink. The electrical connector 271 is to supply electricity to the recording head cartridge 206 when connected with the supporting plate 209 at the time of the recording head cartridge 206 being mounted on the carrier 207.

Further, as shown in FIG. 13B, the discharge unit 206*a* is provided with a hole 274 fitted with the ink tank 206*b*; a hook 273 for installing the ink tank; and a nail 275 to engage with the hook 208 provided for the carrier 207. In this way, the ink tank 206*b* is installed on the discharge unit 206*a* in the state where the ink tank is fitted with the hole 274 of the discharge unit 206*a*. The recording head cartridge 206 is mounted on the carrier 207 by fitting the nail 275 of the discharge unit 206*a* with the hook 208 of the carrier 207.

Figure 14:
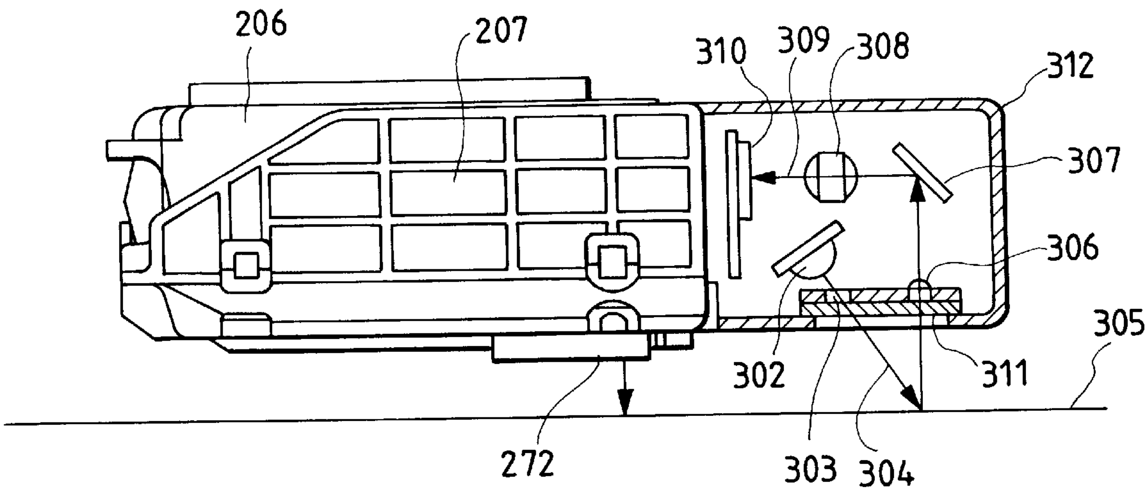
FIG. 14 is a cross-sectional view which shows the inner structure of an image reading device mounted on a carrier.

FIG. 14 is a cross-sectional view which shows the inner structure of the image reading device 300 mounted on the carrier 207.

In FIG. 14, the image reading device comprises an LED 302 to emit light onto the surface of a source document; an LED aperture 303 for passing the LED light 304 emitted from the LED 302; a field lens 306 that condenses the light passing the LED aperture 303 and reflected from the surface of the source document 305; a mirror 307 that refracts the direction of light from the field lens 306 at an angle of 90 degrees; and a sensor 310 that receives the light from the mirror 307 as its image light 309 formed by means of a focusing lens 308.

Also, in the vicinity of the LED aperture 303 and the field lens 306 on the surface of the source document side, a cover 311 that can open or close the aperture and lens is rotatively fixed to the case 312.

Figure 15A:
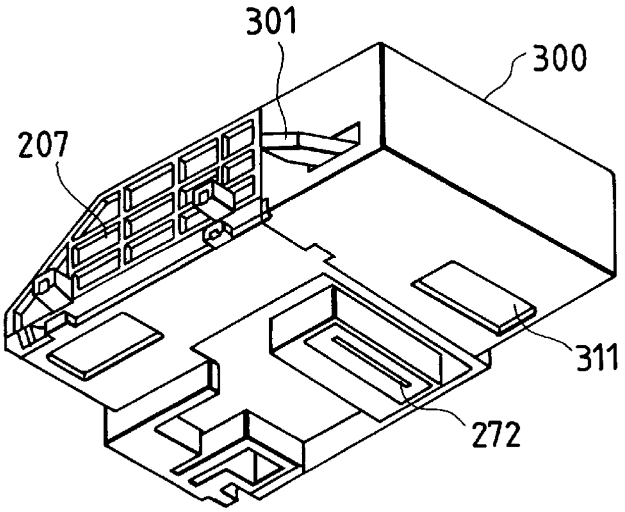
FIGS. 15A and 15B are perspective views which illustrate the outer structure of an image reading device mounted on a carrier.
Figure 15B:
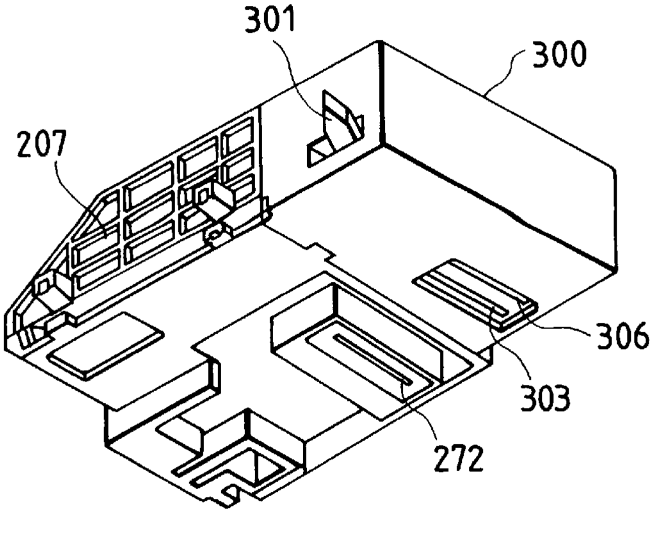

Now, the structure of the carrier 207 will be described. FIGS. 15A and 15B are perspective views showing the outer appearance of the carrier 207, observed from below.

FIG. 15A illustrates the state where the switching lever 301 is on the left side in FIG. 15A, thus the cover 311 being closed to shield the LED aperture 303 and the field lens 306. FIG. 15B illustrates the state where the switching lever 301 is on the right side in FIG. 15B, thus releasing the cover 311 to enable the LED aperture 303 and the field lens 306 to face the surface of a source document. If the switching lever 301 is caused to move further from this state to the right side in FIG. 15B, the cover 311 is closed by means of a clutch mechanism (not shown), and returns to the state shown in FIG. 15A.

Figure 16:
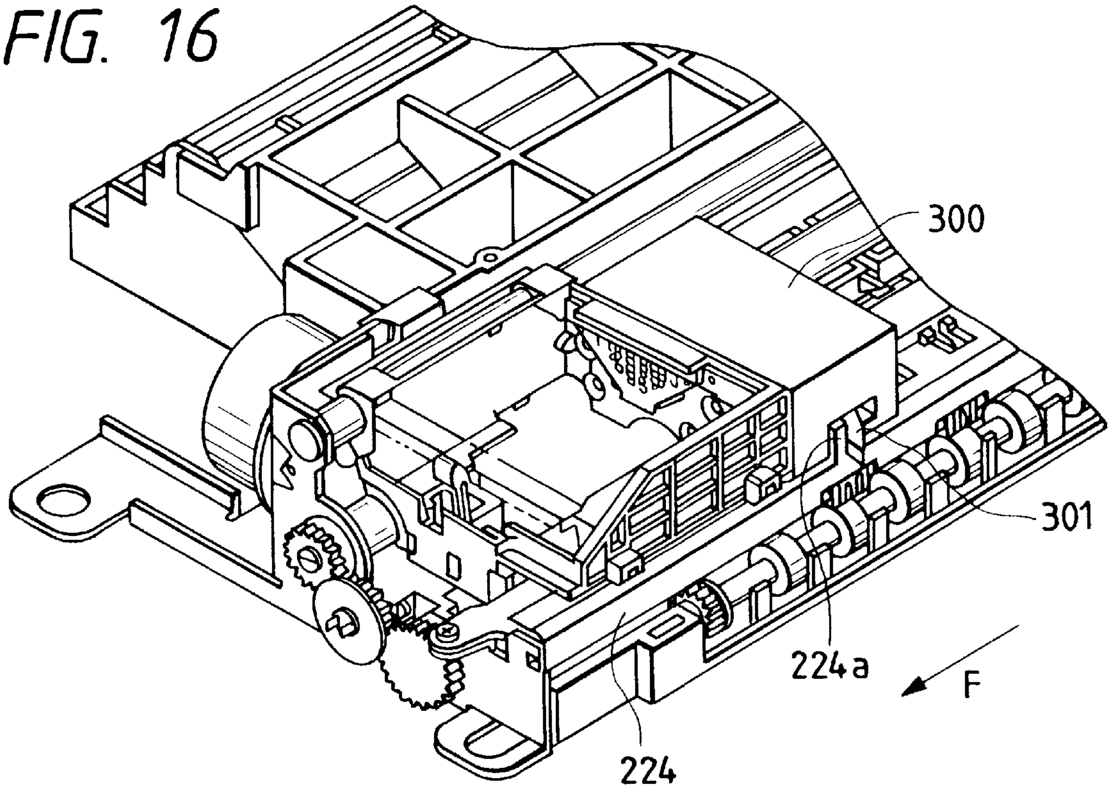
FIG. 16 is a view which illustrates the movement of an image reading device mounted on a carrier.
Figure 17:
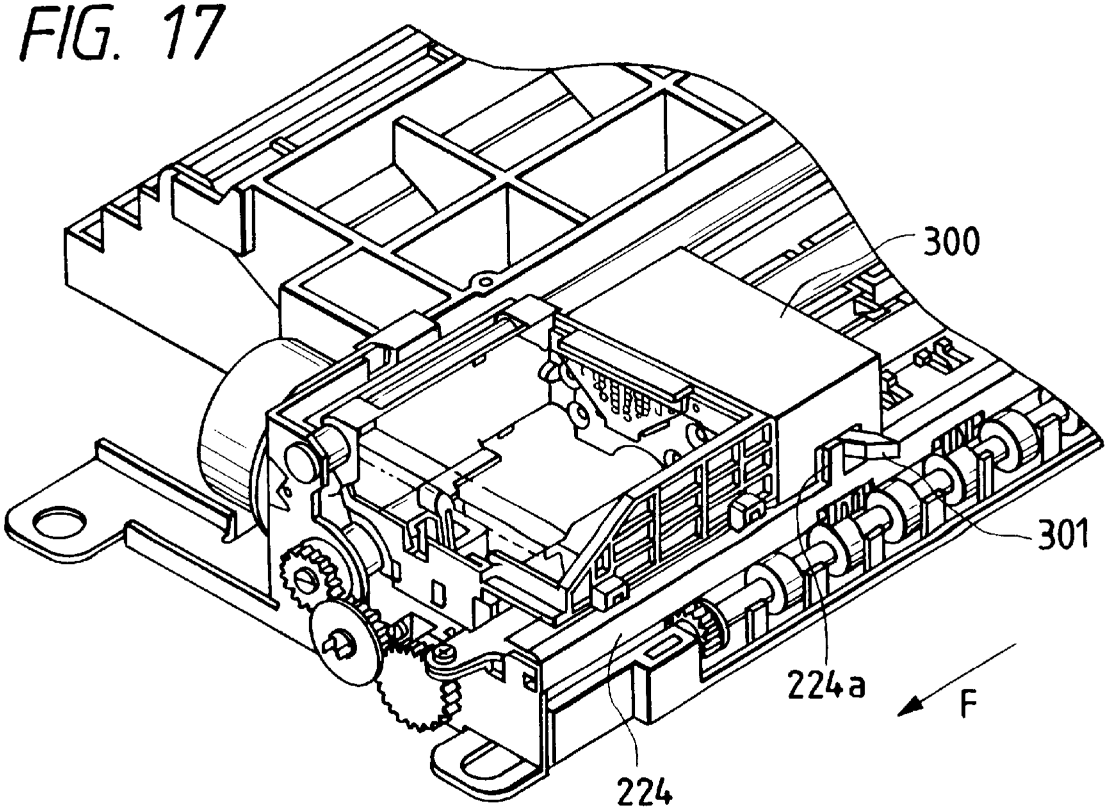
FIG. 17 is a view which illustrates the movement of an image reading device mounted on a carrier.

Now, in conjunction with FIG. 16 and FIG. 17, the description will be made of the operation of the switching lever 301. FIG. 16 and FIG. 17 are perspective views showing the motion of the image reading device mounted on the carrier.

In FIG. 16, when the image reading device 300 is not used, the switching lever 301 is usually on the left side in FIG. 16 as shown in FIG. 15A, thus the cover 311 being closed to shield the LED aperture 303 and the field lens 306.

When the image reading device 300 is used beginning at this state, the carrier 207 is caused to move in the direction indicated by an arrow F in FIG. 16 to enable the extrusion 224*a* of the guide rail 224 to abut upon the switching lever 301. FIG. 16 illustrates this state.

FIG. 17 shows the state where the carrier 207 moves further from this state in the direction indicated by an arrow F in FIG. 17. Thus the extrusion 224*a* causes the switching lever 301 to move in the right direction in FIG. 17 to obtain the state shown in FIG. 15B. In other words, the cover 311 is released to enable the LED aperture 303 and the field lens 306 to face the surface of a source document.

While the source document is being read, the switching lever remains to be in the state as shown in FIG. 17. When the cover 311 should be closed from this state, the carrier 207 is again caused to move to the position represented in FIG. 17, and move further by a given amount in the direction indicated by the arrow F. Then the switching lever 301 returns to the state shown in FIG. 16 by means of a clutching mechanism (not shown). Thus the cover 311 is closed.

Now, with reference to a block diagram shown in FIG. 18, the description will be made of the structure of control means for controlling the driving of an image reading device 300, and a recording apparatus 203 having the image reading device 300 mounted on it. This block diagram shows only connecting relations between each of the blocks. Detailed control lines are omitted. Here, the portion surrounded by a large frame indicates a CPU unit 260.

Figure 18:
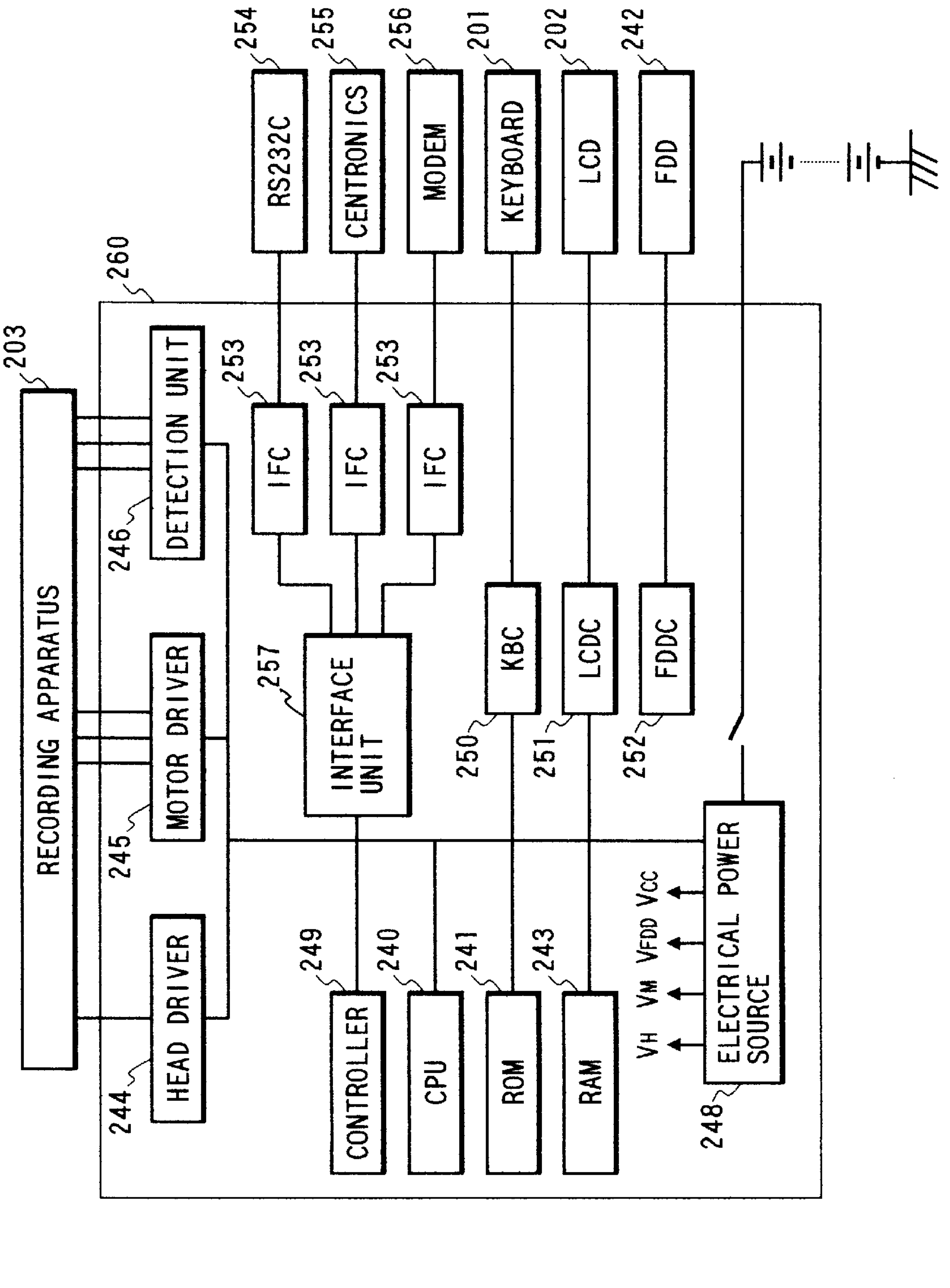
FIG. 18 is a block diagram which shows the control system adopted for the apparatus represented in FIG. 11.

As shown in FIG. 18, this control means is provided with a CPU (central processing unit) 240. The CPU 240 reads program and various data from the ROM 241, floppy disk drive 242, or the like, which will be described later, to make necessary processing and decisions for the execution of various controls. The ROM 241 is a read only memory to store various data required for the execution of recording, such as programs, character codes, dot patterns (character generator: CG), among others. The RAM 243 is a read/write memory comprising a working area for the CPU 240 to provisionally store command data and results of processing; a buffer area to store various data inputted through the keyboard 201, interface unit 257, floppy disk drive 242, or the like; and a text area to retain the contents of documents, among others.

Also, the CPU unit 260 is connected to a recording apparatus 203 through a head driver 244, a motor driver 245, and a detection unit 246. At the same time, the CPU unit is provided with a power-supply 248 and a controller 249 in it.

Under the control of the CPU 240, the head driver 244 drives the recording head cartridge (recording head) 206 and the reading head (image reading device) 300 mounted on the recording apparatus 203. Under the control of the CPU 240, the motor driver 245 drives the feed motor 216 serving as a driving source of the feed roller 215, and the carrier motor 213 to drive the carrier 207 having the recording head cartridge 206 and the reading head 300 mounted on it in the direction perpendicular to the feeding direction of a recording sheet 205. The detection unit 246 transmits detected information to the CPU 240 from the HP sensor 214 installed on the recording apparatus to detect the positions of the carrier 207, and the sheet sensor 218 to detect the position of the recording sheet. The power-supply 248 controls the supplies of electric power $V_H$ for driving the recording head cartridge 206 and the reading head 300, electric power $V_M$ for driving the feed motor 216, the carrier motor 213, and others, electric power $V_{FDD}$ for driving the floppy disk drive 242, and electric power $V_{CC}$ for driving logic circuits.

The controller 249 performs various controls, such as transferring data of the recording head cartridge 206 and the reading head 300, and varying the voltage current of the driving electric powers $V_H$, under the control of the CPU 240.

To the CPU unit 260, the keyboard 201 is connected to input various data required for record, edit, and the like through the keyboard connector (KBC) 250. Also, through the LCD connector (LCDC) 251, the LCD (liquid crystal display) 202 is connected to indicate various information as an indication unit. Here, for this indication unit 202, a CRT (cathode ray tube) or the like may be adopted instead of the LCD.

Further, to the CPU unit 260, the floppy disk drive 242 is connected through the floppy disk drive connector (FDDC) 252. In this respect, it may be possible to arrange the structure by connecting a hard disk, external RAM or the like instead of the floppy disk.

Furthermore, it is possible to connect an interface, such as RS232C 254, centronics 255, MODEM 256, to the CPU unit 260 through the interface connector (IFC) 253 in order to control the recording apparatus 203 by means of an external controller or to communicate with the external equipment.

Now, with reference to a flowchart shown in FIG. 19, the description will be made of controlling procedures for reading a source document by use of the image reading device 300 mounted on the recording apparatus 203, and also, by use of control means described above.

Figure 19:
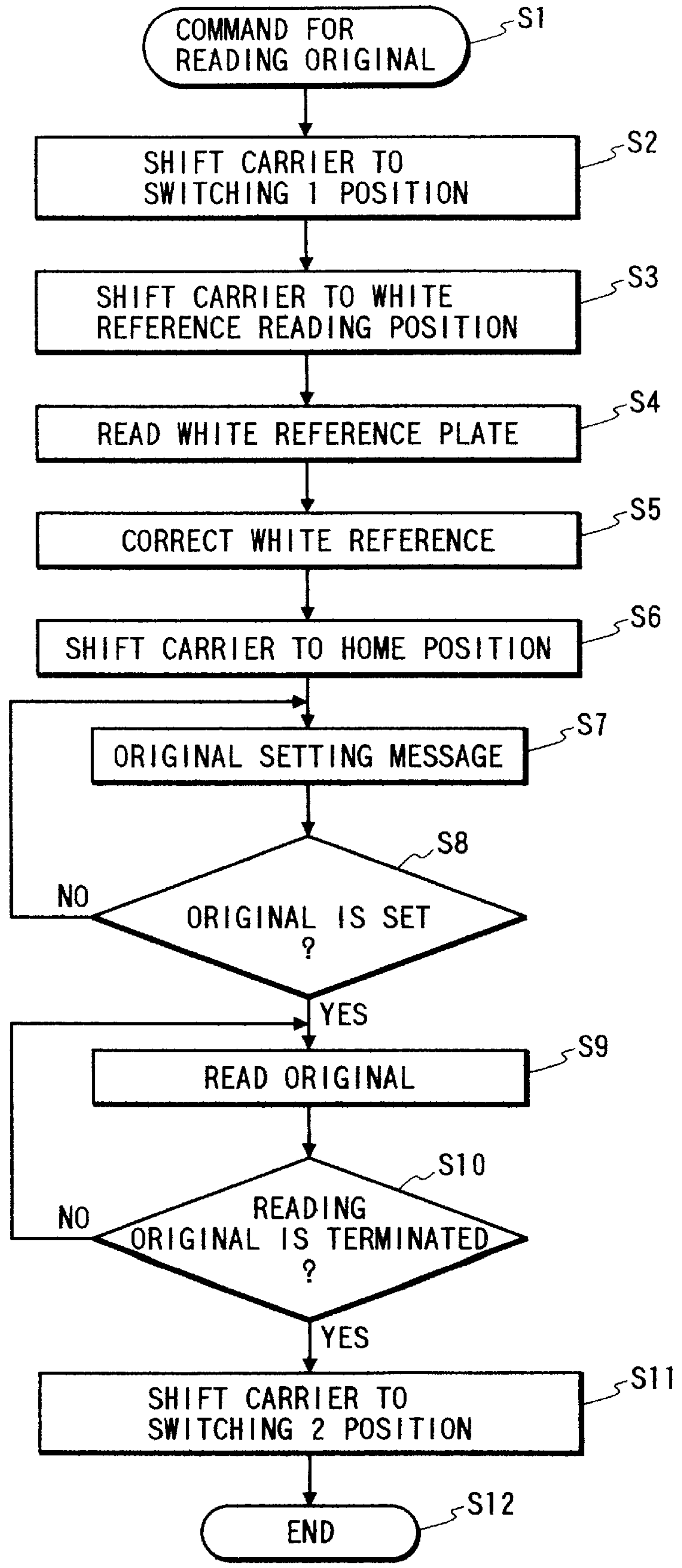
FIG. 19 is a flowchart which illustrates the control operation of source document reading performed by the image reading head represented in FIG. 14.

In FIG. 19, when a command on reading a source document is received (step S1), the carrier is caused to shift to the switching 1 position as shown in FIG. 17 (step S2) in order to release the cover 311 as described earlier. Then, the carrier 207 is caused to shift to a position for reading the white standard (step S3) in order to make reading correction of the image reading device 300. Here it reads the white standard plate 227 (step S4) to correct the white standard (step S5).

Then, the carrier 207 shifts to a given position (home position) (step S6), and the source document setting message is indicated (step S7). When the source document is set (step S8), the carrier 207 travels to read images by means of the image reading device 300 (step S9). When the image reading is completed (step S10), the carrier 207 is caused to shift further to the switching 2 position in the direction indicated by the arrow F in FIG. 17 (step S11) from the position shown in FIG. 17. Thus, a series of operations terminate (step S12).

Here, in practice, the so-called black standard correction is also performed between the steps S5 and S6 described above. This correction is executed in a state that the LED is turned off. Here, however, its description is omitted.

Also, in this mode, the switching lever 301 is driven by the shifting of the carrier 207 to open or close the cover 311. However, it may be possible to use a driving source such as a motor or a solenoid or to utilize the driving of the feed motor or the carrier motor. Such utilization of other power sources is equally applicable.

In accordance with the fourth embodiment described above, the structure is arranged to shield the light emitting portion and the front (reading portion) of the image reading device, but the reading portion can be shielded likewise by rotating the image reading device as a whole as described below.

Figure 20A:
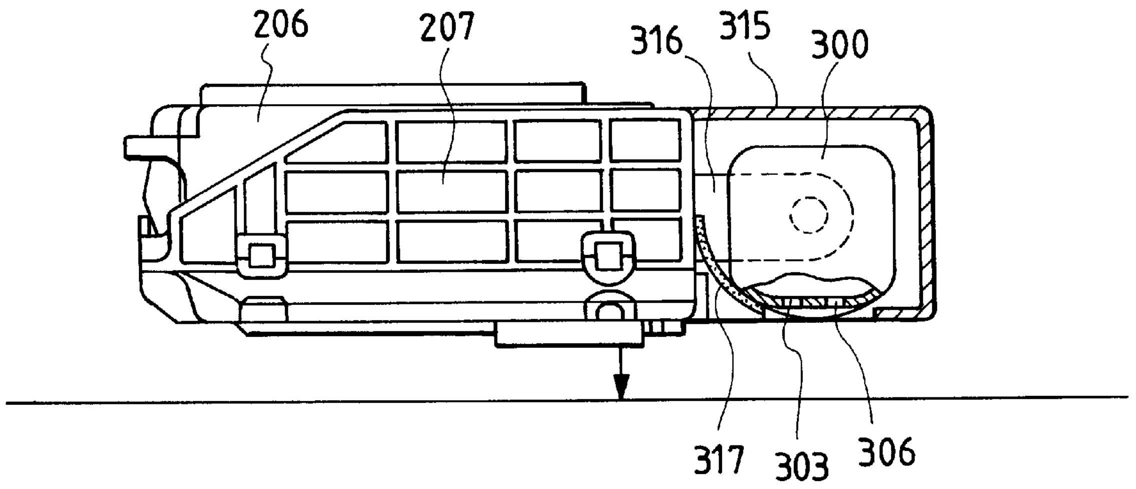
FIGS. 20A and 20B are cross-sectional views which illustrate the inner structure of an image reading device mounted on the carrier of an ink jet recording apparatus, which is a fifth embodiment of the present invention.
Figure 20B:
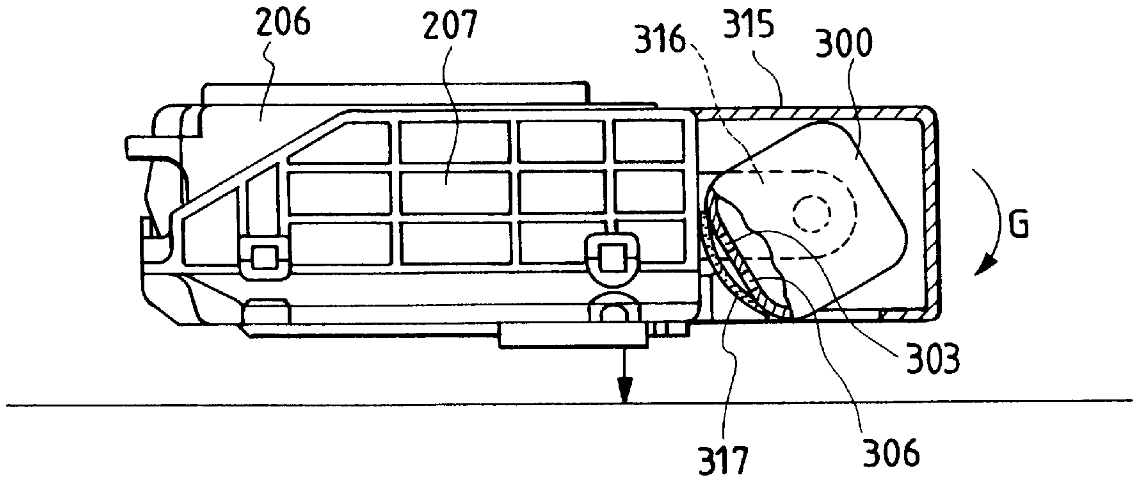

FIGS. 20A and 20B are structural views of a carrier 207, observed from its side, in accordance with a fifth embodiment of the present invention, and partially sectional in order to show the interior of an image reading device.

In FIGS. 20A and 20B, an outer case 315 is integrally mounted on the carrier 207 to cover the image reading device 300. Also, inside the outer case 315, an arm 316 extends from the carrier 207. The image reading device 300 is rotatively fixed to the arm 316. Also, for the outer case 315, a sealing member 317 is provided as a covering member to shield the light emitting portion and light receiving portion (reading portion), and at the same time, to be closely in contact with them by use of felt or the like so as to prevent mist and other particles from entering the light emitting portion and light receiving portion (reading portion) from outside when the image reading device rotates.

FIG. 20A illustrates the state where the image reading device reads images. The LED aperture 303 and the field lens 306 face the surface of a source document.

When the source document has been read, the image reading device 300 is caused to rotate in the direction indicated by an arrow G in FIG. 20B by means of a motor or other driving source (not shown). The LED aperture 303 and the field lens 306 are brought to a halt at a position where the aperture and lens are closely in contact with the sealing member 317. FIG. 20B illustrates this state.

Here, therefore, it is only natural that recording is performed by use of the recording head 206 in the state shown in FIG. 20B.

In this mode, the structure is arranged to rotate the image reading device as a whole. However, it may be possible to arrange so that only the LED aperture 303 and the field lens 306 can rotate, for example. Such arrangement is also equally applicable.

Figure 21A:
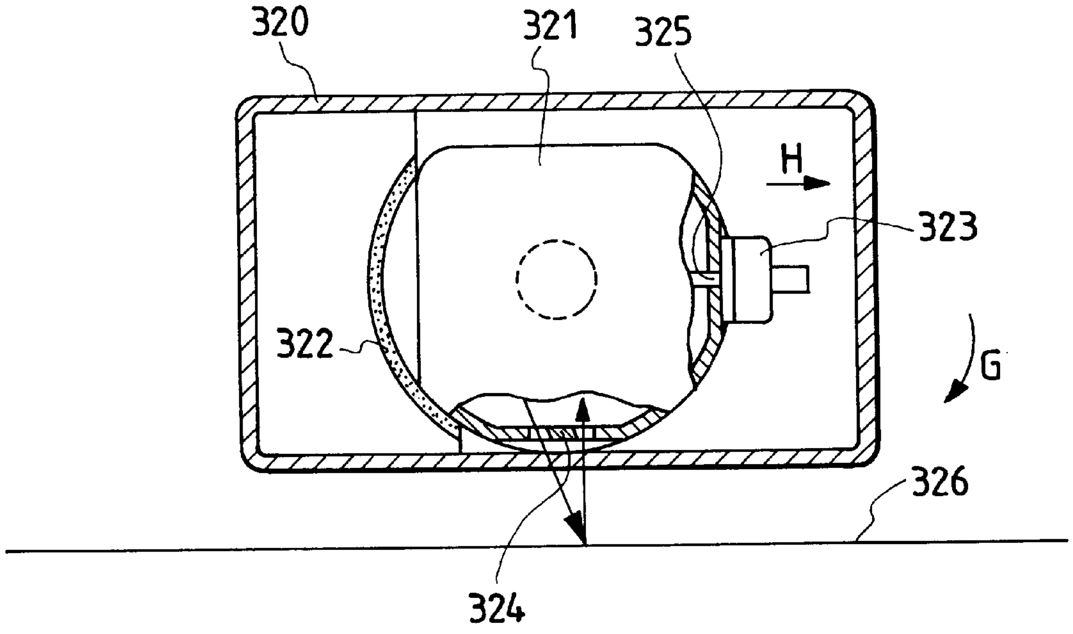
FIGS. 21A and 21B are cross-sectional views which illustrate the operation of the image reading device mounted on the carrier of an ink jet recording apparatus, which is a sixth embodiment of the present invention.
Figure 21B:
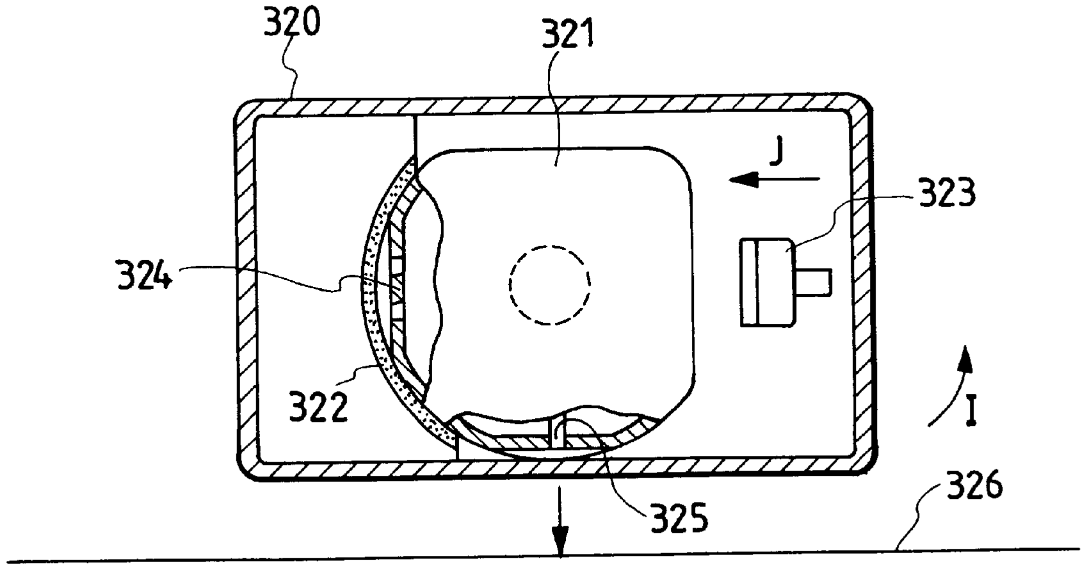

Also, in accordance with the present embodiment, the portions of the recording head 206 and image reading device 300 are separated, but as shown in FIGS. 21A and 21B, it may be possible to incorporate the recording head portion and the reading portion in one head 321 and rotatively install such head on a carrier 320, for example.

The recording head portion and reading portion in the head 321 are structured to provide such positional relationship between them that the ink discharging direction from the reading head 206 and the advancing direction of LED light from the light emitting portion to the light receiving portion (reading portion) 324 form an angle of substantially 90 degrees.

Also, to the carrier 320, a sealing member is installed as a covering member to shield the light emitting and light receiving portions (reading portion) in the same manner as described earlier. Further, a cap 323 is movably installed as a covering member to shield the discharge port surface of the recording head portion.

Here, FIG. 21A illustrates the state where the light emitting and receiving portions 324 of the image reading device face the surface of a source document 326 for reading the source document. Further, the discharge port surface 325 of the recording head portion is covered by the cap 323, hence preventing the discharge port surface from being dried.

When recording begins at this state, the cap 323 is caused to shift in the direction indicated by an arrow H in FIG. 21A, at first, so that it can part from the discharge port surface 325. Then, the head 321 rotates in the direction indicated by an arrow G in FIG. 21A by the rotation of a motor (not shown) or the like that serves as a driving source so as to enable the discharge port surface 325 to face a recording medium 327. FIG. 21B illustrates this state. At this juncture, the light emitting and receiving portions 324 of the image reading device is closely covered by the sealing member.

When reading is performed again beginning at this state, it is good enough if only the rotation is reversed. In other words, the recording head 321 is caused to rotate in the direction indicated by an arrow I in FIG. 21B, and brought to a halt when the light emitting and receiving portions face the surface of a source document. Then, the cap 323 is caused to shift in the direction indicated by an arrow J in FIG. 21B to cover the discharge port surface 325.

Here, in this mode, the image reading device 300 or the head 321 are caused to rotate by means of a motor or some other driving source, but it may be possible to rotate the image reading device 300 or the head 321 by means of carrier traveling, for example. Also, the feed motor may be utilized for the purpose.

Here, in FIGS. 21A and 21B, the positional relationship between the discharge port surface 325 and the light emitting and receiving portions (reading portion) 324 in the head 320 is arranged to be such that the ink discharging direction of the recording head and the advancing direction of LED light of the reading portion form an angle of substantially 90 degrees, but if this arrangement should be made at an angle of 180 degrees, the sealing member 322 and the cap 323 are positioned equally, and then, if the light emitting and receiving portions 324 are covered by the cap 323, for example, ink and other particles adhering to the cap are transferred to the light emitting and receiving portions 324, making it difficult to maintain the accuracy of reading.

Now, the description will be made of an image reading device in accordance with a sixth embodiment of the present invention.

In accordance with the fourth and fifth embodiments, the image reading device is mounted on the carrier. The present invention is equally applicable to an image reading device detachably mountable on a carrier.

Figure 22A:
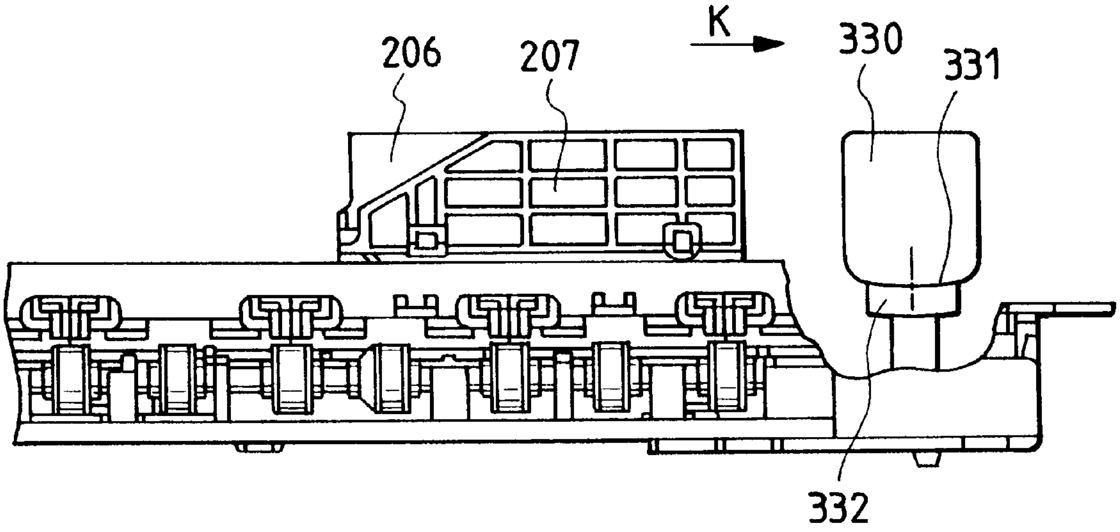
FIGS. 22A and 22B are side views showing the operation of an image reading device mounted on a carrier of an ink jet recording apparatus, which is a sixth embodiment of the present invention.
Figure 22B:
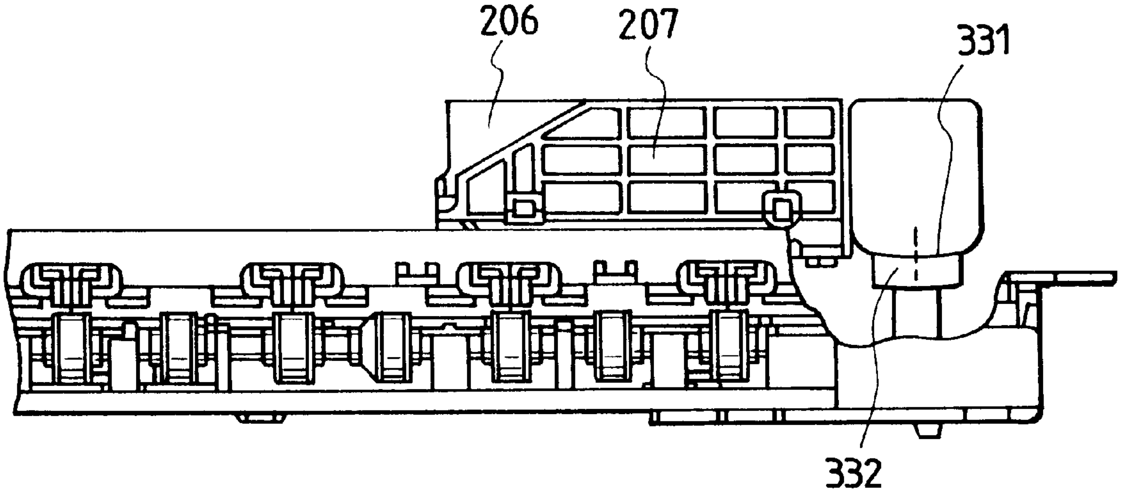

FIGS. 22A and 22B are side views which show the state where an image reading device 330 is detachably mounted in a recording apparatus. In FIGS. 22A and 22B , the image reading device 330 is detachably mounted in the recording apparatus by means of a member (not shown), while the light emitting and receiving portions (reading portion) 331 of the image reading device 330 are covered by a sealing member 332.

Figure 23A:
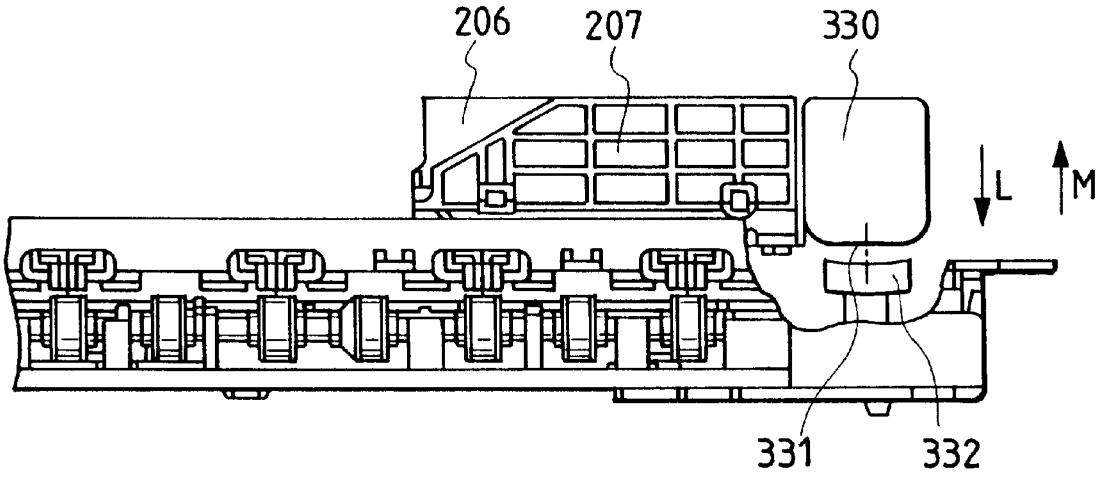
FIGS. 23A and 23B are side views showing the operation of an image reading device mounted on a carrier in accordance with the embodiment represented in FIGS. 22A and 22B.
Figure 23B:
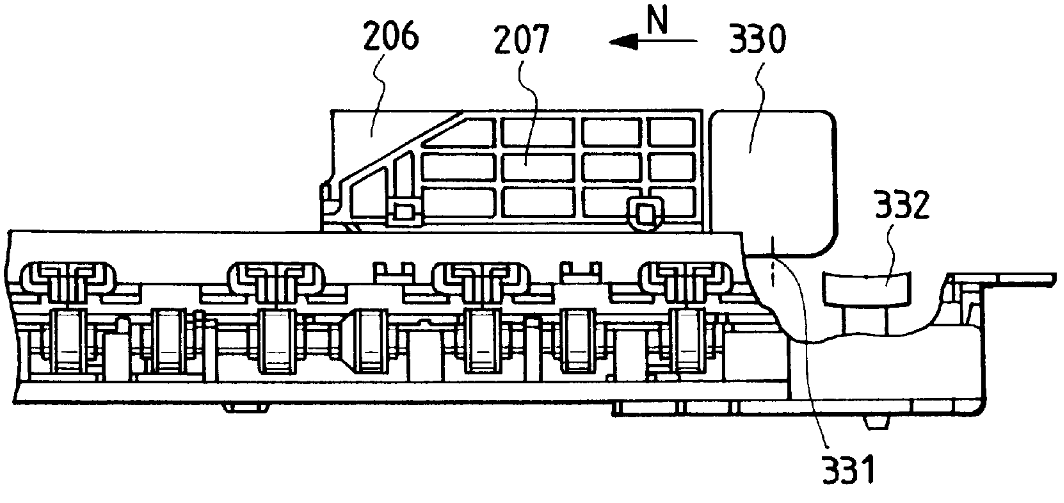

FIG. 22A illustrates the usual state that recording is performed by the recording head. If a source document should be read beginning at this state, the carrier 207 is caused to shift in the direction indicated by an arrow K in FIG. 22A and brought to a halt when the carrier 207 and the image reading device 330 engage with each other by means of a coupling member (not shown). FIG. 22B illustrates this state. From this state, the sealing member 332 is caused to shift in the direction indicated by an arrow L in FIG. 23A by means of a motor or some other driving source (not shown) to enable the sealing member 332 to part from the light emitting and receiving portion 331 as shown in FIG. 23A. In continuation, the carrier 207 is caused to shift in the direction indicated by an arrow N in FIG. 23B, thus making it possible to move the image reading device 330 and the carrier 207 together as shown in FIG. 23B.

The source document is read in this state. When the reading is completed, the carrier 207 is caused to shift to the position where the light emitting and receiving portion 331 of the image reading device 330 face the sealing member 332 in the procedures opposite to those described earlier. Then the sealing member 332 is caused to shift in the direction indicated by an arrow M in FIG. 23A to be in contact with the light emitting and receiving portions 331.

As described earlier, it is not necessarily required to use a motor or some other driving source (not shown) to move the sealing member 332 in the directions indicated by arrows L and M in FIG. 23A, but the feed motor or the carrier motor may be utilized for the purpose.

The description has been made of the fourth to sixth embodiments so far, in which the operation to cover the light emitting and receiving portions (reading portion) of the image reading device is controlled only immediately before reading a source document.

However, when recording is performed, it is only natural that mist and other particles adhere to the cover or sealing member. Conceivably, therefore, if the mist is created in a considerable amount or recording is often performed on the recording medium while almost no source document is read, the reading portion and the cover or the sealing member may be fixed firmly by such mist in some cases.

In such cases, the opening and closing operations of the reading portion and the cover or the sealing member are conducted not only immediately before reading a source document, but a control should be arranged so that if the image reading device is not used longer than a given period, more than three days, for example, an operation is conducted to separate them once, thus making it possible to prevent the reading portion and the cover or the sealing member from being disabled to part from each other due to the fixation. A control of the kind is applicable to a seventh embodiment and an eighth embodiment given below and demonstrates enhanced effects.

Also, in order to confirm whether or not the reading portion is opened and closed exactly with respect to the cover or the sealing member, the white standard plate is read when it is opened or closed. After being opened, the confirmation is made as to whether or not the reading is conducted at the white level, while after being closed, the confirmation is made as to whether or not the reading is conducted at the black level. In this way, it is possible to prevent the light emitting and receiving portions from being left intact by mistake as remaining still open, and to prevent them from being contaminated.

Also, in accordance with the fourth to sixth embodiments described above, the white standard plate is fixed to the platen or the like in a recording apparatus for correcting the white standard of an image reading device, but it may be possible to arrange so that the cover to shield the light emitting and receiving portions (reading portion) of the image reading device or the surface of the sealing member on the light emitting and receiving portion side is colored in white to serve as a white standard plate.

In this case, the method to confirm the opening and closing states of the cover or the sealing member with respect to the reading portion is different from the one described earlier. When the reading portion is shielded by the cover or the sealing member, the white level is read, while the confirmation is made as to the ability of reading only black level even when the LED is illuminated.

Also, there is no problem at all if the white standard plate is made a strip, and then, the method is adopted so that such strip type plate is set only when a white standard correction is made.

Further, since an image reading device usually conducts its black standard correction in addition to the white standard correction, it is generally practiced that the black standard correction is conducted in a state that the LED is turned off. In this case, if any light enters from outside, an external light disturbance takes place. It affects and makes exact correction impossible.

Therefore, if the black standard correction is conducted in a state that the reading portion is closed by the cover or the sealing member, it is possible to carry out the intended correction more accurately because there is no possibility that no light enters from outside.

Also, in the mode of the embodiments described above, a word process is exemplified as an equipment provided with an ink jet recording apparatus, but the present invention is equally applicable to a copying machine, a facsimile equipment, and the like, for example.

Further, in accordance with the fourth to sixth embodiments described above, the description has been made of an apparatus of the so-called serial type where an image reading head and a recording head are caused to travel. However, the present invention is equally applicable to an apparatus using a line sensor and line head of the so-called line type that has a length substantially equal to the width of a source document or a recording medium.

As described above, the fourth to sixth embodiments are such that the reading portion of an image reading device is shielded by means of a covering member when reading is not performed. Therefore, it is possible to prevent such portion from being affected by the adhesion of ink and dust particles or from any contamination caused by ink mist or the like created by an ink jet head at the time of recording. As a result, the image reading device can be mounted in the recording apparatus together with the ink jet recording head.

Also, the opening and closing of the reading portion and the covering member are conducted not only immediately before or after reading, but the opening and closing operations are conducted after a given period of time, thus preventing the covering member from being fixed firmly to the reading portion to become incapable of being opened due to adhesion of ink.

Further, it is possible to provide an ink jet recording apparatus having a simply structured and highly reliable image reading device incorporated in it by utilizing the covering member as a white standard member for the image reading device.

Figure 24:
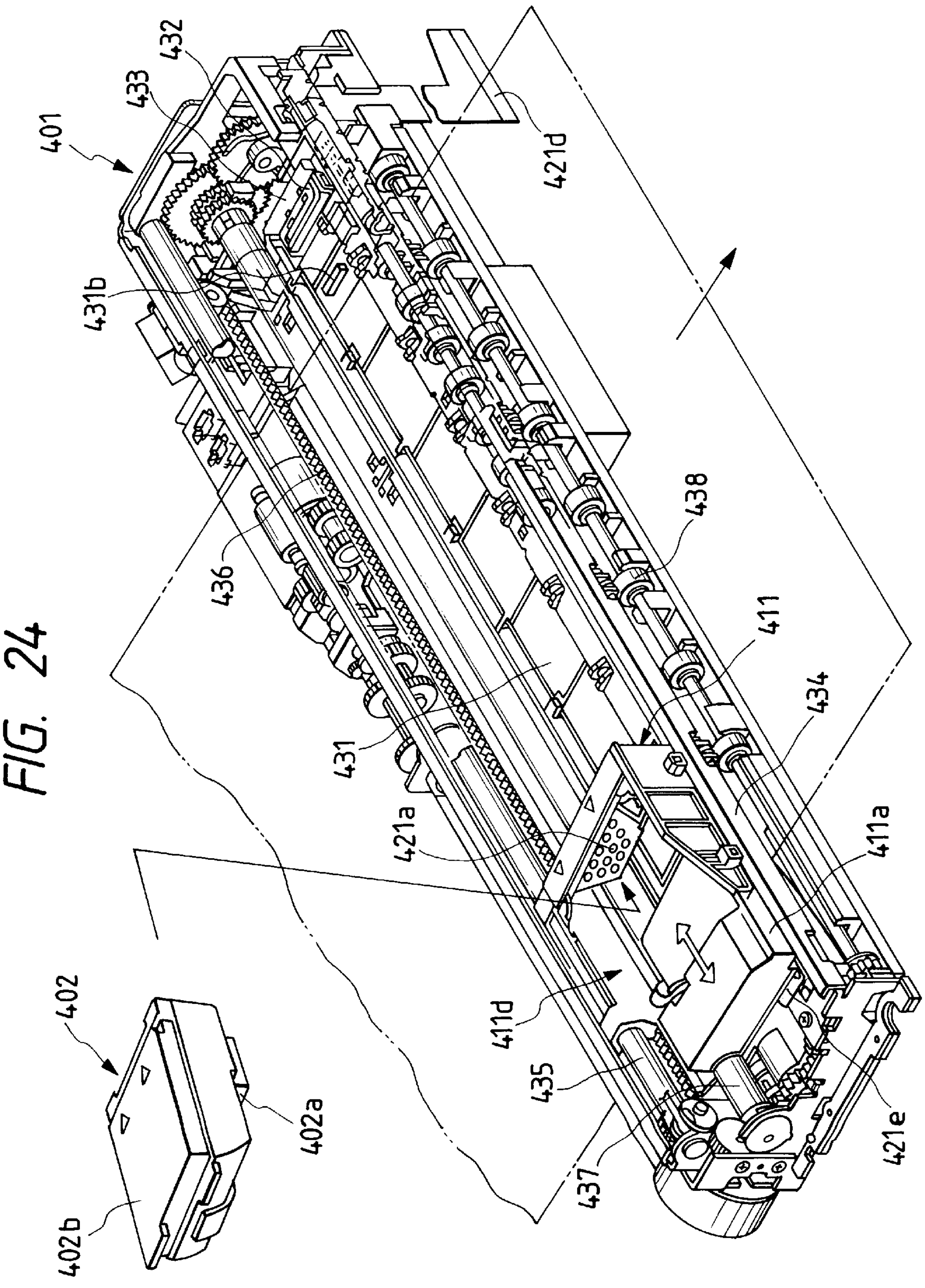
FIG. 24 is a perspective view showing the structure of a printing apparatus having an image reading function, which is a seventh embodiment of the present invention.

Now, with reference to FIG. 24, the description will be made of a mode as a seventh embodiment in accordance with the present invention. FIG. 24 is a perspective view which shows the structure of a printing apparatus having an image reading function as the seventh embodiment of the present invention.

The printing apparatus 401 is to record by the application of an ink jet recording method, which is structured to mount an exchangeable ink jet cartridge (recording cartridge) on a carriage 411 provided with a reading head portion 411*a* serving as a reading unit. In FIG. 24, two-dot chain lines indicate a recording medium such as paper sheet, which is an object of recording by the ink jet cartridge 402, and a source document, which is an object of reading by the reading head portion 411*a*.

The ink jet cartridge 402 is integrally formed by the recording head unit 402*a* to discharge ink onto a recording medium and an ink tank unit 402*a* to retain ink to be discharged. It is of course possible to arrange a recording head and an ink tank separately. The ink tank is provided for the printing apparatus main body, and ink is being supplied to the recording head mounted on a carriage through an ink supply tube. For the recording head unit 402*a*, thermal energy is used, which is generated by electrothermal transducing elements as energy for recording use. Ink is discharged from the discharge ports downward in FIG. 24 in accordance with recording signals in order to perform recording on a recording medium. For the carriage 411, a recess 411*d* is provided for receiving the ink jet cartridge. The bottom of the recess 411*d* is partly open. Through this opening, the recording head unit 402*a* faces a recording medium, such as a paper sheet. A head contact unit 421*a* is arranged in the carriage 411 to form electrical connection with the ink jet cartridge 402. The head contact unit 421*a* and the electric circuits (not sown) on the main body side are connected through a movable lead cable portion 421*c* of a flexible cable and a printed circuit board 421*d*.

The carriage 411 is slidably supported by two guide rail 434 and 435 extending in the main scanning direction, and travels above a platen 431 in the main scanning direction when a belt 436 coupled to the carriage 411 is driven. The platen 431 is to hold a recording medium or a source document while in recording or in reading. Then, on both sides of the platen 431 in the sub-scanning direction, a sheet feed roller 437 and a sheet exhaust roller 438 are arranged, respectively, to feed the recording medium or the source document on the platen 431, and to exhaust the recording medium or the source document on the platen. The feeding direction of the recording medium or the source document is sub-scanning direction, which is almost rectangular to the main scanning direction in which the carriage 411 travels. The entire range of traveling of the carriage 411 in the main scanning direction is not necessarily used for reading a source document or recording on a recording medium. To the areas near both ends of traveling range, the recording medium or the source document is not supplied and fed. The width of the portion used for reading a source document or for recording on a recording medium in the main scanning direction is defined as the reading and recording width W. A pair of extrusions 431*a* and 431*b* are arranged on the platen 431 to place this reading and recording width W between them. Further, on a location (home position) beyond the extrusion 431*b* in the main scanning direction, there are provided a head cap 432 for capping the discharge port surface of the recording head unit 402*a*, and a wiping blade 433 for cleaning the discharge port surface of the recording head unit 402*a* as required. These head cap 432 and wiping blade 433 are arranged by driving means (not shown) to advance to or retract from the discharge port surface.

Figures 25A, 25B:
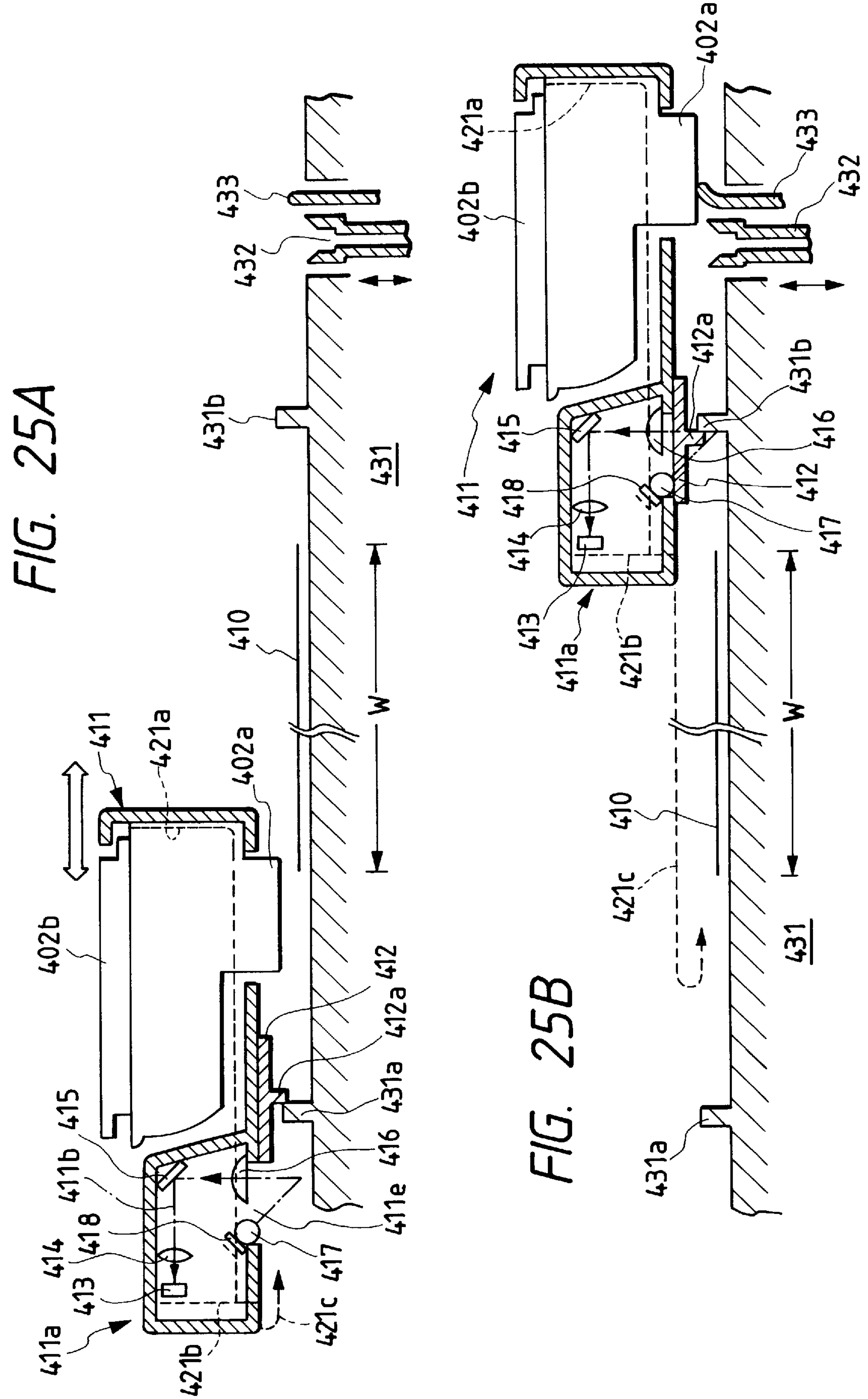
FIGS. 25A and 25B are cross-sectional views taken on the plane in parallel with the main scanning direction (the direction in which a carriage travels).

FIGS. 25A and 25B are cross-sectional view taken along the plane parallel to the main scanning direction to show the inner structure of the reading head 411*a*. FIG. 25A illustrates the state where the carriage 411 is positioned on the extrusion 431a side. FIG. 25B illustrates the state where the carriage 411 is positioned on the extrusion 431*b* side, which is located on the home position side. In FIGS. 25A and 25B, one-dot chain lines indicate the optical path 411*b* of an optical system.

In the reading head 411*a*, there are provided a reading sensor 413 such CCD; a master lens 414 to focus images on the reading sensor 413; a reflective mirror 415 that projects the incident light from a source document 410 to the master lens; a field lens 416 arranged on the incident light side of the reflective mirror 414; LED (light emitting diode) 418 for illuminating the surface of a source document; a rod lens 417 that projects the light from the LED 418 for use of illumination; and electric circuits 421*b* including the circuits to process image signals detected by the reading sensor 413. The electric circuits 421*b* are connected to the movable lead cable unit 421*c*. An aperture 411*c* is provided for the reading head 411*a* on the platen 431 side. The light from the LED 418 for use of illumination reaches the source document 410 through this aperture 411*c* by way of the rod lens 417. The reflected light from the source document passes this aperture 411*c* to be incident upon the field lens 416, and passes further the reflective mirror 415, and the master lens 414 to be incident upon the reading sensor 413. Also, a shutter 412 is provided for the reading head 411*a* to shield the aperture 411*c*. The shutter 412 moves between the opening position and closing position by sliding in the main scanning direction. For the shutter 412, an extrusion 412*a* is arranged extending to the platen 431 side. Along the traveling of the carriage 412, this extrusion 412*a* abuts upon the extrusions 431*a* and 431*b* on the platen 431 side. In this way, the shutter 412 is arranged to slide.

Now, the operation of this printing apparatus will be described. At first, the description will be made of the recording operation with respect to a recording medium.

When the carriage 411 is caused to shift in the direction toward the home position, the extrusion 412*a* of the shutter 412 abuts upon the extrusion 431*b* of the platen 431. Then, by means of the shutter 412, the aperture 411*c* of the reading head 411*a* is closed. After that, by means of the sheet feed roller 437, a recording medium is fed to the position facing the carriage 411. The carriage 411 is caused to reciprocate in the main scanning direction within a range that the extrusion

431*a* on the opposite side and the extrusion 412*a* do not abut upon each other. At the same time, ink is discharged from the recording head 402*a* of the ink jet cartridge 402 toward a recording medium in accordance with recording signals. In this way, recording is performed for one-line portion on the recording medium. In continuation, the recording medium is fed for one-line portion in the sub-scanning direction, and then, ink is again discharged while the carriage 411 is caused to reciprocate for recording on the next line. For the printing apparatus of the present embodiment, the aperture 411*c* of the reading head 411*a* is always closed by the shutter 412 while the recording is performed by the application of ink jet recording method. Therefore, it is possible to prevent the bounced ink and ink mist from entering the interior of the reading head 411*a* while recording is performed. Also, the capping of the recording head unit 402*a* by means of a head cap 432 and the cleaning of the discharge port surface by means of a wiper blade 433 are executed when the carriage 411 is on the home position side. In other words, these operations are performed while the aperture 411*c* of the reading head 411*a* is closed by the shutter 412. Therefore, it is possible to prevent ink mist from entering the interior of the reading head 411*a* when the capping and cleaning are executed. Further, it is generally practiced that ink jet cartridges 402 are exchanged when the carriage 411 is in the home position. At this juncture, the shutter 412 is closed. Thus ink mist is not allowed to enter the interior of the reading head 411*a* when the ink jet cartridges are exchanged.

Now, the description will be made of the operation of the reading head 411*a* when it reads a source document 410. When the carriage 411 is caused to shift in the direction opposite to the home position, the extrusion 412*a* of the shutter 412 abuts upon the extrusion 413*a* to move the shutter 412, thus the aperture 411*c* being opened. Then, the source document 410 is being fed as in the case of a recording medium. The carriage 411 is allowed to reciprocate within a range that each of the extrusions 431*a* and 431*b* of the platen 431 do not abut upon the extrusion 412*a* of the shutter 412. More specifically, the carriage 411 is caused to reciprocate within the range of the reading and recording width W to read the source document 410.

In accordance with the present embodiment, the extrusions 431*a* and 431*b* are provided for the platen 431. The carriage 411 is caused to reciprocate so that the extrusion 412*a* provided for the shutter 412 abuts upon the extrusions 431*a* and 431*b* in order to control the shutter 412 to be opened or closed. However, it may be possible to provid a small motor or an actuator for the carriage itself to open or close the shutter. If a small motor or the like is installed on the carriage itself for opening and closing the shutter, it is possible to make an arrangement that a command on opening or closing the shutter is issued to the printing apparatus from the personal computer to which the printing apparatus having the image reading function is connected. Here, a menu operation or a command input is made on the personal computer side in order to open the shutter in a reading mode and close it in a printing mode, thus reducing the amount of the carriage movement significantly.

As described above, with the provision of a shutter for the reading head, the present embodiment makes it possible to eliminate the fear that the interior of the reading head of the carriage is contaminated by ink resulting from the ink adhesion that may take place when recording heads are replaced or floating ink mist and bounced ink when recording is performed. As a result, a source document is read exactly without any errors or the reading precision is maintained without any degradation. At the same time, there is an effect that cleaning of lens or the like becomes unnecessary.

Now, the description will be made of an eighth embodiment in accordance with the present invention. The present embodiment is such that the white standard correction is executed by use of the shutter of the seventh embodiment.

Figure 26A:
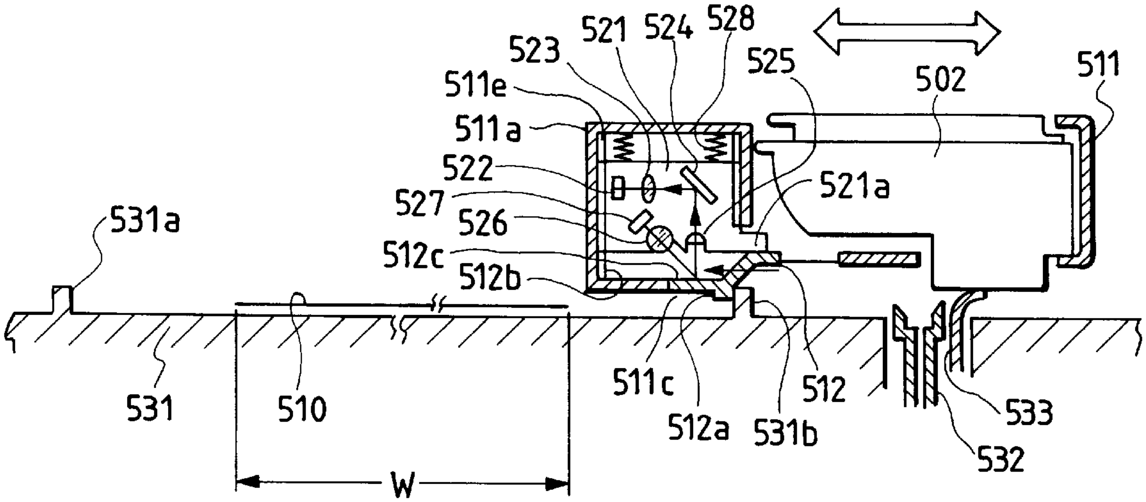
FIGS. 26A and 26B are cross-sectional views taken on the plane in parallel with the carriage traveling direction, which is an eighth embodiment of the present invention.
Figure 26B:
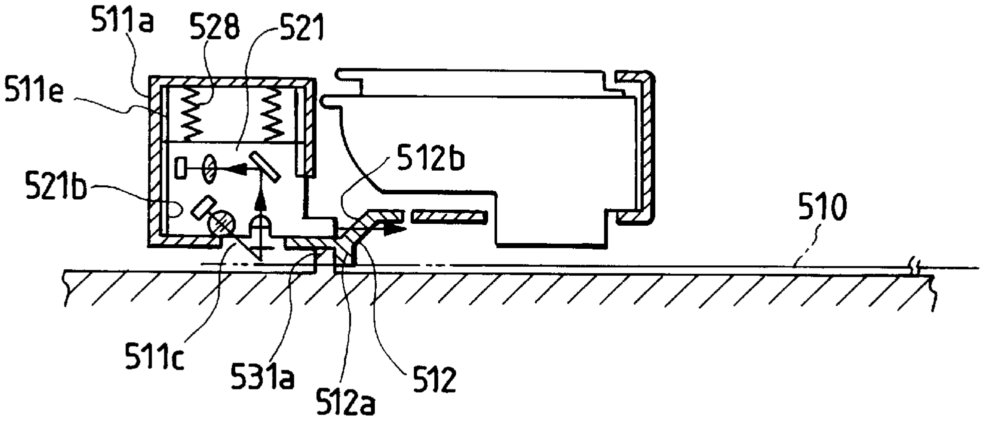

FIGS. 26A and 26B are cross-sectional views taken along the plane parallel to the main scanning direction of a printing apparatus: FIG. 26A illustrates the state where the carriage 511 is positioned on the shutter closing extrusion 531*b* side; FIG. 26B illustrates the state where the carriage 511 is positioned on the shutter opening extrusion 531*a* side.

As shown in FIGS. 26A and 26B, an optical unit 521 is arranged in the reading head 511*a* serving as a reading unit. The optical unit 521 comprises a reading sensor 522 such as CCD; a master lens 523 that focuses images on the reading sensor 522; a mirror 524 to project incident light from a source document 510 on the master lens 523; a field lens 525 arranged on the incident side of the mirror 524; a light source LED (light emitting diode) 527 to illuminate the surface of the source document; and a rod lens 526 to project the light from the light source LED 527 on the surface of the source document.

Also, for the reading head 511*a* on the platen 531 side, an aperture 511*c* is provided. The light from the light source LED 527 reaches the source document side through the aperture 511*c* by way of the rod lens 526. The reflective light from the source document 510 side is incident upon the field lens 525 through the aperture 511*c*, and further, it is incident upon the reading sensor 522 through the mirror 524 and the master lens 523. Also, for the reading head 511*a*, an extrusion 512*a* is provided, which extends to the platen 531 side, and a shutter 512 is provided to shield the aperture 511*c*. The carriage 511 moves between the shutter opening position and the shutter closing position. Along such movement of the shutter, the extrusion 512*a* abuts upon the shutter opening extrusion 531*a* and shutter closing extrusion 531*b* on the platen 531 side. In this way, the shutter 512 can slide. In this respect, the white standard piece 512*c* that becomes the reference for white correction is provided for the portion of the shutter 512 that abuts upon the surface of the aperture 511*c* on the optical unit 521 side. Here, the optical unit 521 is guided by the side wall of the reading head 511*a*, and pressed to the shutter 512 by means of a spring 528 provided inside the reading head 511*a*. Then, along the opening and closing operations of the shutter 512, this optical unit moves up and down in FIGS. 26A and 26B by means of the cam section arranged for the shutter 512, and the stylus section 521*a* of the optical unit 521, which are in contact with the optical unit to hold it.

In this respect, a rail section 511*e* is provided for the inner wall of the reading head 511*a*. Also, a guided groove 521*b* is provided for the optical unit 521, which is guided by the rail section 51l*e* of the reading head 511*a*. This arrangement prevents the optical unit 521 from being inclined when it ascends or descends.

Hereunder, the description will be made of the operation of the reading unit structured as described above.

At first, the carriage 511 is caused to shift to the shutter opening position in the direction opposite to the home position. Then, as shown in FIG. 26B, the extrusion 512*a* abuts upon the shutter opening extrusion 531*a*. The aperture 511*c* is in the released state by means of the shutter 512. A source document 510 is being read.

When the source document is being read, no recording is performed. Therefore, there is no possibility that the optical unit 521 is stained with ink.

Then, when the carriage 511 is caused to shift in the direction of the home position to the shutter closing position, the extrusion 512*a* abuts upon the shutter closing extrusion 531*b* as shown in FIG. 26A. The aperture 511*c* is in the closed state by means of the shutter 512.

If recording is performed in this state, there is no possibility that the optical unit of the reading unit 521 is affected by ink mist and bounced ink.

Also, with the aperture 511*c* being in the closed state, the white correction is conducted by use of the white standard piece 512*c* provided for the shutter 512. At this juncture, however, the stylus section 521*a* ascends along the cam section 512*b*. As a result, the optical unit 521 is caused to part from the white standard piece 512*c*.

Consequently, if the distance between the optical unit 521 and the white standard piece 512*c* after the stylus section 521*a* ascends is defined to be the same as the distance between the optical unit 521 and a source document 510 at the time of reading the source document, there is no change in brightness.

Figure 27:
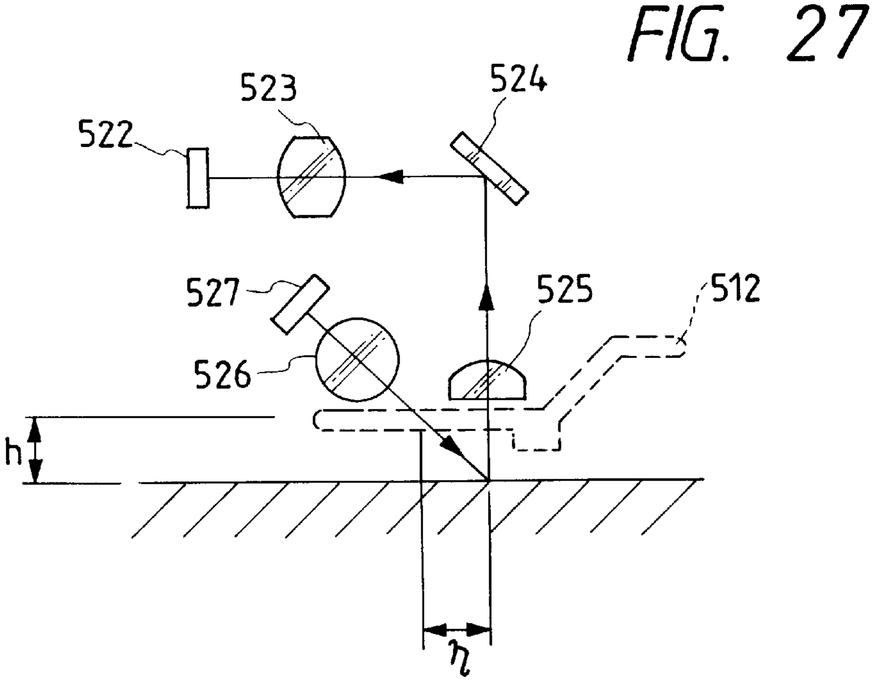
FIG. 27 is a view which schematically shows the optical system of the image reading unit represented in FIGS. 26A and 26B.

FIG. 27 is a view which schematically shows the optical system of the reading unit represented in FIGS. 26A and 26B.

As shown in FIG. 27, in accordance with the present embodiment, if the position of the white standard piece and the surface of a source document are caused to deviate by an amount of height h, the illuminated field should be deviated by an amount of A. Thus the reading position becomes darker, and the white density changes inevitably. With this mechanism, it is possible to make the white correction in good precision.

In this respect, it is generally preferable to make an arrangement so that the illuminating condition at the time of white correction is equal to the illuminating condition at the time of reading a source document.

Also, the description has been made of the white standard piece 512*c* being affixed to the shutter 512 for conducting the white correction, but the same effect is obtainable even if the shutter and the white standard piece are formed together.

For example, it is conceivable to form the shutter 512 with a white resin material of a regulated density.

As described above, in accordance with the present embodiment, it is possible to demonstrate the effects given below, because the shutter shields the aperture by causing the extrusion provided for the shutter to engage with the shutter closing extrusion provided for the platen, and also, because along the movement of the shutter, the distance between the reading unit and the white standard piece provided for the shutter is set at the same distance between the reading unit and a source document at the time of reading the source document.

(1) There is no fear that the white standard piece is stained with ink.

(2) The distance between the reading unit and the white standard piece at the time of executing the white correction can be made equal to the distance between a source document and the reading unit at the time of reading the source document. As a result, the white correction can be made in good precision.

(3) There is no fear that the white standard piece is lost.

(4) There is no possibility that the reading unit is stained with bounced ink or the like at the time of recording.

Figure 28:
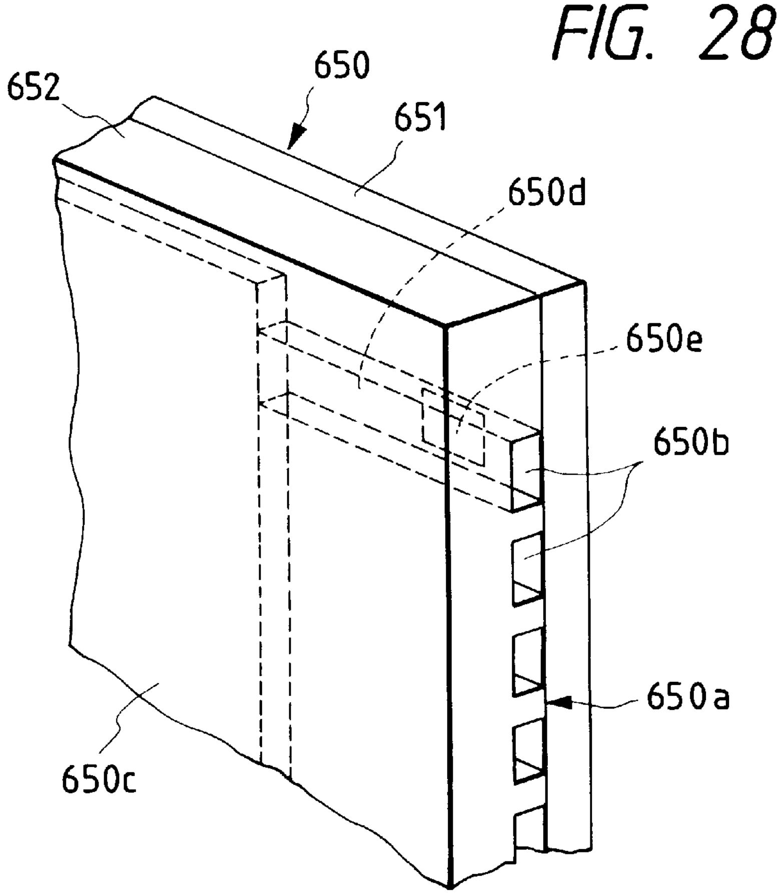
FIG. 28 is a view which schematically shows the ink discharge ports of the ink jet recording apparatus.

In this respect, the reading unit or reading head of the first to eighth embodiments described above demonstrates enhanced effects if the unit or the head is used for a recording apparatus that records on a recording medium by use of a recording head of an ink jet type. FIG. 28 is a view which schematically shows the ink discharge port unit of such recording head.

Ink supplied to a common liquid chamber 650*c* from an ink tank (not shown) is induced to each of liquid paths 650*d* to form meniscus and hold it at each of the discharge ports 650*b*. At this juncture, electrothermal transducing elements are selectively driven to create film boiling and generate an air bubble in each of the liquid paths 650*d*. With the development of this air bubble, ink is discharged from each discharge port 650*b*. In this respect, electrothermal transducing elements are shown as elements to generate energy for discharging ink, but such elements are not necessarily limited to the electrothermal transducing elements. It may be possible to adopt piezoelectric elements or the like, which generate mechanical energy that exerts discharging pressure instantaneously.

What is claimed is:

1. A reading unit having an optical system, said reading unit being removably mounted on a recording apparatus to read a source document, comprising:

- a housing having said optical system therein;
- a light transmitting portion arranged on an outer surface of the housing of said reading unit in order to guide light outside said reading unit into the optical system of said reading unit; and
- a protection member positionable for selectively covering the outer side of said light transmitting portion such that said light transmitting portion is openable and closable.

2. A reading unit according to claim 1, wherein said protection member is slidably installaed on the outer surface of the housing of said reading unit.

3. A reading unit according to claim 1, wherein said protection member and said housing are provided with a holding mechanism to maintain an opening state or closing state of said protection member.

4. A reading unit according to claim 3, wherein said holding mechanism is provided with a stopper provided in a groove arranged on the outer surface of said housing so as to allow the stopper to shift protrusively toward said protection member, and said protection member is provided with a recess so as to be able to engage with said stopper.

5. A reading unit according to claim 1, wherein said reading unit is provided with opening and closing control means for releasing the shield of said light transmitting portion effectuated by said protection member when said reading unit is mounted on said recording apparatus.

6. A reading unit according to claim 5, wherein said opening and closing control means is provided with an elastic member biasing said protection member to be positioned so as to shield said light transmitting portion, and a lever member being displaced by abutting upon said recording apparatus when said reading unit is mounted on said apparatus in order to cause said protection member to shift against a biasing force exerted by said elastic member.

7. A reading unit according to claim 6, wherein said lever member is connected with said protection member through a flexible resin member.

8. A reading unit according to claim 1, wherein said protection member is provided with a shutter unit to shield said light transmitting portion, a rotational pivot to rotate said shutter unit to the position to shield said light transmitting portion, and a weight portion formed in a position making the angle formed by said weight portion and said shutter unit centering on said rotation pivot to be more than 90 degrees and less than 180 degrees, having a rotational moment greater than that of said shutter unit.

9. A recording apparatus provided with traveling means for causing an image reading device having an image reading portion for reading a source document and a recording head for recording images on a recording medium to move relatively with respect to the source document or the recording medium, comprising:

a covering member, provided on a carriage, to shield said image reading portion of said image reading device when reading is at rest;

wherein said image reading device is provided with driving means for driving said covering member to cover said image reading portion, and said driving means is driven by said traveling means.

10. A recording apparatus according to claim 9, wherein said driving means drives said covering member changeably in accordance with the traveling position of said traveling means in order to shield or expose the reading portion of said image reading device.

11. A recording apparatus according to claim 9, wherein said carriage is provided with said image reading device, and further, a mounting portion to mount said recording head.

12. A recording apparatus according to claim 9, wherein said recording head is an ink jet head to discharge ink from the ink discharge ports for recording on said recording medium.

13. A recording apparatus according to claim 9, wherein said recording head is provided with electrothermal transducing elements, at the same time, being an ink jet head to record on said recording medium by discharging ink from the ink discharge ports by use of thermal energy generated by said electro-thermal transducing elements.

14. An ink jet recording apparatus provided with traveling means for causing an image reading device having an image reading portion for reading a source document and a recording head for recording images on a recording medium to move relatively with respect to the source document or the recording medium, comprising:

coupling means for detachably mounting said image reading device on said traveling means; and a covering member to shield the reading portion of said image reading device when reading is at rest, said covering member being arranged to part from the reading portion of said image reading device when reading is executed, at the same time, said image reading device being mounted on said traveling means by use of said coupling means.

15. An ink jet recording apparatus according to claim 14, wherein said recording apparatus is arranged so that the discharge port formation surface of said recording head and the reading portion of said image reading device form an angle of substantially 90 degrees in the circumferential direction, and is provided separately with a first covering member to shield said reading portion when recording is performed by said recording head, and a second covering member to cover said discharge port formation surface when image reading is performed by said image reading portion.

16. An ink jet recording apparatus according to claim 14, wherein said recording apparatus is provided with control means for controlling said covering member to shield said reading portion, and controls to cause said reading portion and said covering member to part from each other after a given period of using time elapses.

17. An ink jet recording apparatus according to claim 14, wherein said recording apparatus is provided with a white standard member for use of the white standard correction of said image reading device, and controls to read said white standard member after said reading portion and said covering member are caused to part from each other.

18. An ink jet recording apparatus according to claim 17, wherein said recording apparatus uses a part of said covering member as said white standard member.

19. An ink jet recording apparatus according to claim 14, wherein said recording head is an ink jet head to discharge ink from the ink discharge ports to recording on said recording medium by use of thermal energy generated by said electrothermal transducing elements.

20. An ink jet recording apparatus according to claim 14, wherein said recording head is provided with electrothermal transducing elements, at the same time, being an ink jet head to record on said recording medium by discharging ink from the ink discharge ports by use of thermal energy generated by said electro-thermal transducing elements.

21. A recording apparatus capable of recording on a recording medium by the application of an ink jet recording method, and of reading a source document, comprising:

a carriage having an ink jet recording head removably mounted on the carriage for discharging ink onto said recording medium and having mounted on said carriage a reading head provided with an opening on the surface opposite to the source document for reading said source document, and reciprocating in a main scanning direction while maintaining a given gap with respect to said recording medium;

a shutter mounted on said carriage and arranged to move between a releasing position and a closing position with respect to said opening, said shutter being able to shut off optical components included in said reading head from the outside atmosphere by closing said opening;

an engaging portion that engages the reading head in association with a movement of said carriage at the releasing position and the closing position, said shutter being opened and closed in association with the engagement.

22. A recording apparatus according to claim 21, wherein said recording medium and said source document are fed by one and the same feeding means in the direction different from the main scanning direction to the position where said carriage reciprocates.

23. A recording apparatus according to claim 21, wherein a platen is arranged to face a position where said carriage reciprocates in order to hold said recording medium and said source document.

24. A recording apparatus according to claim 23, wherein a pair of first extrusions are arranged for said platen with respect to both edges of a range for said carriage to reciprocate, and a second extrusion is provided for said shutter to be able to engaged with said extrusions so as to enable said shutter to shift between said closing position and said releasing position when said first extrusions engage with said second extrusion by means of the reciprocation of said carriage.

25. A recording apparatus according to claim 21, wherein driving means is provided for said carriage to drive said shutter.

26. A recording apparatus according to claim 21, where said ink jet recording head is detachably mountable on said shutter.

27. A recording apparatus according to claim 26 wherein an ink tank to supply ink to said ink jet recording head is integrally formed with said ink jet recording head.

28. A recording apparatus according to claim 21, wherein said ink jet recording head is provided with energy elements generating energy to be utilized for discharging ink.

29. A recording apparatus according to claim 21, wherein said shutter is provided with a white standard piece to become a reference for the white standard, said white standard piece being provided at a position facing the reading head when the shutter is in the closing position.

30. A recording apparatus according to claim 29, wherein said recording apparatus is arranged to make the distance between said reading head and said white standard piece at the time of said opening being in the closing position equal to the distance between said reading head and said source document at the time of said aperture being in the releasing position.

31. A recording apparatus comprising:

a head mounting section for mounting a head member; and a reading head mountable on said head mounting section, said reading head including:

a housing having an optical system therein;

a light transmitting portion arranged on an outer surface of said housing to guide light outside said reading head into the optical system of said reading head; and a protection member positionable for selectively covering the outer side of said light transmitting portion such that said light transmitting portion is openable and closable.

32. A recording apparatus according to claim 31, wherein said protection member is slidably installed on the outer surface of said housing.

33. A recording apparatus according to claim 31, wherein said protection member and said housing are provided with a holding mechanism to maintain an opening state or closing state of said protection member.

34. A recording apparatus according to claim 33, wherein said holding mechanism is provided with a stopper provided in a groove arranged on the outer surface of said housing so as to allow the stopper to shift protrusively toward said protection member, and said protection member is provided with a recess so as to be able to engage with said stopper.

35. A recording apparatus according to claim 31, wherein said recording apparatus is provided with opening and closing control means for releasing the shield of said light transmitting portion effectuated by said protection member when said reading head is mounted on said recording apparatus.

36. A recording apparatus according to claim 35, wherein said opening and closing control means is provided with an elastic member biasing said protection member to be positioned so as to shield said light transmitting portion, and a lever member being displaced by abutting upon said recording apparatus when said reading head is mounted on said apparatus in order to cause said protection member to shift against a biasing force exerted by said elastic member.

37. A recording apparatus according to claim 36, wherein said lever member is connected with said protection member through a flexible resin member.

38. A recording apparatus according to claim 31, wherein said protection member is provided with a shutter unit to shield said light transmitting portion, a rotational pivot to rotate said shutter unit to the position to shield said light transmitting portion, and a weight portion formed in a position making the angle formed by said weight portion and said shutter unit centering on said rotation pivot to be more than 90 degrees and less than 180 degrees, having a rotational moment greater than that of said shutter unit.

39. A recording apparatus according to claim 31, wherein said head mounting section is operable to mount a recording head.

40. A recording apparatus according to claim 39, wherein said head mounting section is operable to mount a recording head instead of said reading head.

41. A recording apparatus according to claim 31, wherein said head mounting section is operable to mount a recording head and said recording head is an ink jet recording head for discharging ink for recording.

42. A recording apparatus according to claim 31, wherein said head mounting section is operable to mount a recording head instead of said reading head.

43. A recording apparatus having a head mounting section for mounting a head member, said apparatus comprising:

a reading head mountable on said head mounting section, said reading head including:

a housing having an optical system therein;

a light transmitting portion arranged on an outer surface of said housing to guide light outside said reading head into the optical system of said reading head; and a protection member positionable for selectively covering the outer side of said light transmitting portion such that said light transmitting portion is openable and closable.

* * * * *

UNITED STATES PATENT AND TRADEMARK OFFICE

CERTIFICATE OF CORRECTION

PATENT NO. : 5,903,401
APPLICATION NO. : 08/652966
DATED : May 11, 1999
INVENTOR(S) : Hiroyuki Tanaka et al.

It is certified that error appears in the above-identified patent and that said Letters Patent is hereby corrected as shown below:

AT [56] REFERENCES CITED:

Under Attorney, Agent or Firm

"Fitzpatrick, Cella, Harper & Scinto" should read
--Fitzpatrick, Cella, Harper & Scinto--.

COLUMN 4

Line 51, "representing" should read --represented--.

COLUMN 5

Line 39, "the,shutter" should read --the shutter--.

COLUMN 20

Line 20, "view" should read --views--.
Line 30, "such" should read --such as--.

COLUMN 21

Line 46, "provid" should read --provide--.

UNITED STATES PATENT AND TRADEMARK OFFICE

CERTIFICATE OF CORRECTION

PATENT NO. : 5,903,401
APPLICATION NO. : 08/652966
DATED : May 11, 1999
INVENTOR(S) : Hiroyuki Tanaka et al.

It is certified that error appears in the above-identified patent and that said Letters Patent is hereby corrected as shown below:

COLUMN 26

Line 49, "engaged" should read --engage--.

Signed and Sealed this

Twenty-eighth Day of August, 2007

JON W. DUDAS
*Director of the United States Patent and Trademark Office*